(12) United States Patent
Loberg

(10) Patent No.: US 10,289,758 B2
(45) Date of Patent: May 14, 2019

(54) AUTOMATICALLY RESOLVING BOUNDARIES WITHIN AN ARCHITECTURAL DESIGN ENVIRONMENT

(71) Applicant: DIRTT ENVIRONMENTAL SOLUTIONS INC., Salt Lake City, UT (US)

(72) Inventor: Barrie Arnold Loberg, Millarville (CA)

(73) Assignee: DIRTT Environmental Solutions, Ltd., Calgary (CA)

( * ) Notice: Subject to any disclaimer, the term of this patent is extended or adjusted under 35 U.S.C. 154(b) by 386 days.

(21) Appl. No.: 14/891,007

(22) PCT Filed: Mar. 24, 2014

(86) PCT No.: PCT/IB2014/001055
§ 371 (c)(1),
(2) Date: Nov. 13, 2015

(87) PCT Pub. No.: WO2014/191828
PCT Pub. Date: Dec. 4, 2014

(65) Prior Publication Data
US 2016/0085885 A1  Mar. 24, 2016

Related U.S. Application Data

(63) Continuation-in-part of application No. PCT/US2013/050764, filed on Jul. 16, 2013, and a
(Continued)

(51) Int. Cl.
*G06F 17/50* (2006.01)

(52) U.S. Cl.
CPC ...... *G06F 17/5004* (2013.01); *G06F 2217/02* (2013.01)

(58) Field of Classification Search
None
See application file for complete search history.

(56) References Cited

U.S. PATENT DOCUMENTS 3,972,163 A   8/1976   Coperthwaite
4,207,714 A   6/1980   Mehls
(Continued)

FOREIGN PATENT DOCUMENTS

CN   102902848   1/2013
EP   1066579     1/2002
(Continued)

OTHER PUBLICATIONS

Singapore Search Report and Written Opinion for application No. 11201608357X dated Oct. 2, 2017.
(Continued)

*Primary Examiner* — Syed A Roni
(74) *Attorney, Agent, or Firm* — Workman Nydegger

(57) ABSTRACT

A computer system can automatically resolve anomalies within an architectural design by receiving a digital architectural design comprising a first furniture sub-component, a second furniture sub-component, and a third furniture sub-component. The system can then identify one or more joints between the various furniture sub-components. After identifying the joints, the system can include identifying an anomaly at the intersection of the joints. The anomaly can be created when the joints fail to create a proper corner. The system can then automatically resolve the anomaly by changing the type of at least one of the joints within the digital architectural design.

20 Claims, 15 Drawing Sheets

Related U.S. Application Data continuation of application No. PCT/US2013/043735, filed on May 13, 2013.

(56) References Cited

U.S. PATENT DOCUMENTS

| | | | |
|---|---|---|---|
| 4,705,401 A | 11/1987 | Addleman |
| 4,964,060 A | 10/1990 | Hartsog |
| 5,255,207 A | 10/1993 | Cornwell |
| 5,625,827 A | 4/1997 | Krause |
| 5,673,374 A | 9/1997 | Sakaibara |
| 5,801,958 A | 9/1998 | Dangelo |
| 5,866,419 A | 2/1999 | Meder |
| 5,870,771 A | 2/1999 | Oberg |
| 6,078,332 A | 6/2000 | Ohazama |
| 6,097,394 A | 8/2000 | Levoy |
| 6,268,863 B1 | 7/2001 | Rioux |
| 6,292,810 B1 | 9/2001 | Richards |
| 6,493,679 B1 | 12/2002 | Rappaport |
| 6,580,426 B1 | 6/2003 | Small |
| 6,629,065 B1 | 9/2003 | Gadh |
| 6,900,841 B1 | 5/2005 | Mihara |
| 6,971,063 B1 | 11/2005 | Rappaport |
| 7,016,747 B1 | 3/2006 | Ninomiya |
| 7,019,753 B2 | 3/2006 | Rappaport |
| 7,062,454 B1 | 6/2006 | Giannini |
| 7,085,697 B1 | 8/2006 | Rappaport |
| 7,096,173 B1 | 8/2006 | Rappaport |
| 7,099,803 B1 | 8/2006 | Rappoport |
| 7,155,228 B2 | 12/2006 | Rappaport |
| 7,171,208 B2 | 1/2007 | Rappaport |
| 7,216,092 B1 | 5/2007 | Weber |
| 7,243,054 B2 | 7/2007 | Rappaport |
| 7,246,045 B1 | 7/2007 | Rappaport |
| 7,277,830 B2 | 10/2007 | Loberg |
| 7,292,908 B2 | 11/2007 | Borne et al. |
| 7,299,168 B2 | 11/2007 | Rappaport |
| 7,299,416 B2 | 11/2007 | Jaeger |
| 7,623,137 B1 | 11/2009 | Miller |
| 7,817,823 B1 | 10/2010 | O'Donnell |
| 7,825,937 B1 | 11/2010 | Sakhartchouck |
| 8,150,660 B2 | 4/2012 | Reghetti |
| 8,255,338 B1 | 8/2012 | Brittan |
| 8,271,336 B2 | 9/2012 | Mikurak |
| 8,276,008 B2 | 9/2012 | Ke |
| 8,285,707 B2 | 10/2012 | Day |
| 8,290,849 B2 | 10/2012 | Eisler |
| 8,301,527 B2 | 10/2012 | Tarbox |
| 8,332,401 B2 | 12/2012 | Hull |
| 8,332,827 B2 | 12/2012 | Edde |
| 8,335,789 B2 | 12/2012 | Hull |
| 8,386,918 B2 | 2/2013 | Do |
| RE44,054 E | 3/2013 | Kim |
| 8,402,473 B1 | 3/2013 | Becker |
| 8,411,086 B2 | 4/2013 | Rieffel |
| 8,423,391 B2 | 4/2013 | Hessedenz |
| 8,510,382 B2 | 4/2013 | Purdy |
| 8,442,850 B2 | 5/2013 | Schorr |
| 8,521,737 B2 | 8/2013 | Hart |
| 8,566,419 B2 | 10/2013 | Purdy |
| 8,600,989 B2 | 12/2013 | Hull |
| 8,626,877 B2 | 1/2014 | Greene |
| 8,645,973 B2 | 2/2014 | Bosworth |
| 8,650,179 B2 | 2/2014 | Driesch |
| 8,773,433 B1 | 7/2014 | Smyrl |
| 2001/0044707 A1 | 11/2001 | Gavin et al. |
| 2003/0011596 A1 | 1/2003 | Zhang |
| 2004/0027371 A1 | 2/2004 | Jaeger |
| 2004/0075655 A1 | 4/2004 | Dunnett |
| 2004/0100465 A1 | 5/2004 | Stowe |
| 2004/0174358 A1 | 9/2004 | Takagi |
| 2005/0044133 A1 | 2/2005 | Hashimoto |
| 2005/0071135 A1 | 3/2005 | Vredenburgh |
| 2005/0072059 A1 | 4/2005 | Hodsdon |
| 2005/0104883 A1 | 5/2005 | Snyder |
| 2006/0041842 A1 | 2/2006 | Loberg |
| 2006/0274064 A1 | 12/2006 | Dougherty |
| 2007/0098290 A1 | 5/2007 | Barton |
| 2007/0109310 A1 | 5/2007 | Xu |
| 2007/0276791 A1 | 11/2007 | Fejes |
| 2008/0249756 A1 | 10/2008 | Chaisuparasmikul |
| 2009/0128558 A1 | 5/2009 | Morello |
| 2009/0145075 A1 | 6/2009 | Oakley |
| 2009/0187389 A1 | 7/2009 | Dobbins |
| 2010/0018141 A1 | 1/2010 | Kelly |
| 2010/0036520 A1 | 2/2010 | Barbir |
| 2010/0121626 A1 | 5/2010 | Montana et al. |
| 2010/0128038 A1 | 5/2010 | Hoffman |
| 2010/0268513 A1 | 10/2010 | Loberg |
| 2011/0054652 A1 | 3/2011 | Heil |
| 2011/0191706 A1 | 8/2011 | Loberg |
| 2011/0227922 A1 | 9/2011 | Shim |
| 2011/0227924 A1 | 9/2011 | Nakajima |
| 2011/0265405 A1 | 11/2011 | Ksenych |
| 2012/0078583 A1 | 3/2012 | Kupferle |
| 2012/0288184 A1 | 11/2012 | Zomet |
| 2014/0095122 A1 | 4/2014 | Appleman |
| 2014/0176530 A1 | 6/2014 | Pathre |

FOREIGN PATENT DOCUMENTS

| | | |
|---|---|---|
| EP | 2207140 | 7/2010 |
| JP | 02039377 | 2/1990 |
| JP | 2000132706 | 5/2000 |
| JP | 2007264707 | 10/2007 |
| KR | 1020090126574 | 12/2009 |
| WO | 02059545 | 8/2002 |
| WO | 2005114495 | 12/2005 |
| WO | 2007138560 | 12/2007 |
| WO | 2009111885 | 9/2009 |
| WO | 2013040016 | 3/2012 |
| WO | 2012126010 | 9/2012 |
| WO | 2012162442 | 11/2012 |
| WO | 2012173741 | 12/2012 |
| WO | 2014191828 | 12/2014 |

OTHER PUBLICATIONS

Non-Final Office action for U.S. Appl. No. 14/117,844 dated Sep. 8, 2017.

Noush, Mathias, and Bernhard Jung. "CAD on the World Wide Web: vitrual assembly of furniture with BEAVER." Proceedings of the fourth symposium on Virtual reality modeling language. ACM, 1999.

International Search Report PCT/IB2014/001055, dated Sep. 22, 2014.

Supplementary Search Report for application EP 14804947 dated Dec. 16, 2016.

Supplementary European Search Report for application No. EP13873507 dated Jun. 15, 2017.

Gene S. Miller et al: "Illumination and Reflection Maps: Simulated Objects in Simulated and Real Environments", Course Notes for Advanced Computer Graphics Animation, SIGGRAPH 1984, Jul. 23, 1984 (Jul. 23, 1984), pp. 1-7, XP055372329, Retrieved from the Internet: URL:http://www.pauldebevec.com/ReflectionMapping/IlluMAP84.html [retrieved on May 12, 2017] *sections 3-8*.

Wolfgang Heidrich et al: "Realistic, hardware-accelerated shading and lighting", Computer Graphics Proceedings. SIGGRAPH 99; [Computer Graphics Proceedings. SIGGRAPH], ACM ?—New York, NY, USA 1515 Broadway, 17th Floor New York, NW 10036 USA, Jul. 1999 (Jul. 1999), pp. 171-178, XP058128790, DOI: 10.1145/311535.311554 ISBN: 978-0-201-48560-8 *Sections 3 and 4*.

"Autodesk Revit architecture for AutoCAD Users", White Paper, Autodesk, Inc., 2011.

Non-Final Office Action in U.S. Appl. No. 14/115,299 dated Jul. 28, 2017.

Ravi Mamoorthi et al., "A First-Order Analysis of Lighting, Shading, and Shadows," ACM Transactions on Graphics, vol. 26, No. 1, Article 2, Jan. 31, 2007. See p. 2, 8, and 12-15.

(56) References Cited

OTHER PUBLICATIONS

Errco, "Erco Guide," http://www.erco.com/download/ data/30_media/guide_pdf/ 120_en/_erco_guide_7_simulation.pdf, May 12, 2006. See p. 376, 389-388, 399, and 427.
Joseph Zupko et al., "System for Automated Interactive Lighting (SAIL)," In: Proceedings for the 4th International Conference on Foundations of Digital Games, 2009, pp. 223-230. See pp. 223-226.
Maxwell Render, "Maxwell Render 2.5 User Manual," http://www.architektur.uni-kl.de/digitalewrkzeuge/ss13/digitalewerkzeuge/maxwel-english.pdf, Dec. 31, 2010. See p. 22-25, 36-37, and 48-49.
Jeremy Birn, "Digital Lighting and Rendering," Pearson Education, 2nd ed., 2006, ISBN 0132798212. See p. 35-59.
Pierre-Felix Breton, "Autodesk Revit and 3ds Max Design for Lighting and Daylighting simulation," http://www.pfbreton.com/wordpress/wp-content/uploads/2012/05/L12L07%20Handout.pdf, May 7, 2012. See pp. 28, 51-52, and 87-103.
David Cohn, "Photorealistic Rendering Techniques in AutoCAD3D," Autodesk University 2009, http://www.dscohn.com/AU/handouts/AU214-2%20-%20Photorealistic%20Rendering%20Techniques%20in%20AutoCAD%203D.pdf, Dec. 31, 2009. See pp. 4-6.
International Search Report and Written Opinion for PCT/US2012/068805 dated Aug. 29, 2013.
International Search Report and Written Opinion for PCT/US2013/024009 dated Oct. 25, 2013.
International Search Report and Written Opinion for PCT/US2013/024063 dated Oct. 25, 2013.
International Search Report and written opinion for PCT/US2013/023198 dated Oct. 18, 2013.
CG Blog; "Photoshop tutorial and post-production glasses"; www.grafica3dblog.it/photoshop_tutorial_glass.htm; pp. 1-7, Unknown.
International Search Report and Opinion, PCT/US2013/045047, dated Mar. 3, 2014.
International Search Report and Opinion, PCT/US2013/043735, dated Feb. 27, 2014.
International Search Report and Opinion, PCT/US2013/050764, dated Feb. 27, 2014.
Ram Schacked et al.: "Automatic Lighting Design Using a Perceptual Quality Metric"; 2001; Eurographic 2011 vol. 20 (2001); p. 1-12.
Non-Final Office action for U.S. Appl. No. 14/113,260 dated Sep. 14, 2015.
Non-Final Office action for U.S. Appl. No. 14/348,879 dated Sep. 22, 2015.
Non-Final Office Action for U.S. Appl. No. 14/110,910 dated Sep. 14, 2015.
Final Office Action for U.S. Appl. No. 14/110,910 dated Feb. 2, 2016.
Final Office Action for U.S. Appl. No. 14/348,879 dated Feb. 22, 2016.
Notice of Allowance for U.S. Appl. No. 14/113,260 dated Mar. 23, 2016.
International Search Report and Opinion, PCT/US2015/011105, dated May 5, 2015.
BeLight, Live Interior 3D Pro User's Manual, 2010.
Whitted, An Improved Illumination Model for Shaded Display, Jun. 1980, Communications of the ACM, vol. 23 No. 6.
"Chuang, Efficient Image-Based Methods for Rendering Soft Shadows, 2006, URL:http://www.csie.ntu.edu.tw/~cyy/courses/rendering/06fall/lectures/handouts/lec15_sshadow1 .pdf".
"Wiki, List of color spaces and their uses, 2012, URL:https://en.wikipedia.org/w/index.php?title=List_of color_spaces_and_their_uses&oldid=507999322".
Wynn, Cube Maps, 2001, URL: https://developer.nvidia.com/sites/default/files/akamai/gamedev/docs/CubeMaps.pdf.
Drettakis, Interactive Update of Global Illumination Using a Line-Space Hierarchy, ACM SIGGRAPH 97.
Cruless, Ray Tracing URL: http://courses.cs.washington.edu/courses/cse557/09au/lectures/ray-tracing.pdf, Washington University, CSE 557 Falll 2009. pp. 1-40.
Non-Final Office Action in U.S. Appl. No. 14/110,910 dated Aug. 12, 2016.
John Chapman: "john-chapman.net—Deferred Rendering, Transparency & Alpha Blending", Aug. 1, 2011 (Aug. 1, 2011), pp. 1-7, XP0552959287, Retrieved from the Internet: URL:http://www.john-chapman.net/content.php?id=13 [retrieved on Aug. 17, 2016].
Anonymous: OpenGL FAQ / 15 Transparency, Translucency, and Using Blending Dec. 30, 1999 (Dec. 30, 1999), XP055273530, Retrieved from the Internet: URL: http://www.opengl.org/archives/resources/faq/technical/transparency.htm [retrieved on May 19, 2016].
Supplementary European Search Report for application No. EP131873,685 dated Aug. 19, 2016.
Non-Final Office Action for U.S. Appl. No. 14/117,844 dated Sep. 29, 2016.
European Search Report for application No. EP 13/872,502 dated Aug. 17, 2016.
Michael Kass: "Interactive Depth of Field Using Simulated Diffusion on a GPU", 2006, pp. 1-8, XP002760859, Retrieved from the Internet: URL: http://graphics.pixar.com/library/DepthOfField/paper.pdf [retrieved on Aug. 17, 2016].
Shaan Hurley: "Learn to Walk and Fly in AutoCAD", Jan. 23, 2009 (Jan. 23, 2009), pp. 1-7, XP002760860, Retrieved from the Internet: URL: http://autodesk.blogs.com/between_the_lines/2009/01/learn-to-walk-and-fly-in-autocad.html [retrieved on Aug. 17, 2016].
Jean-Eudes Marvie et al: "The FL-system: a functional L-system for procedural geometric modeling", The Visual Computer; International Journal of Computer Graphics, Springer, Berlin, DE, vol. 21, No. 5, Jun. 1, 2005 (Jun. 1, 2005), pp. 329-339, XP019339112, ISSN:1432-8726, DOI: 10.1007/S00371-005-0289-Z.
Supplementary European Search Report for application No. PCT/U52013043735 dated Sep. 30, 2016.
Notice of Allowance in U.S. Appl. No. 14/110,910 dated Dec. 13, 2016.
Supplementary Search Report for application No. EP13885779 dated Dec. 14, 2016.
Lau et al., "Converting 3D Furniture Models to Fabricate Parts and Connectors", ACM Transactions on Graphics Jul. 2011.
Non-Final Office Action in U.S. Appl. No. 14/115,299 dated Dec. 30, 2016.
"Lau, M. Ei Al., Converting 3D furniture models to fabricatable parts andconnectors. ACM Transactions on Graphics (TOG)—Proceedings of ACMSIGGRAPH2011, Jul. 31, 2011, vol. 30, No. 4, pp. 1-8".
"Revit Architecture 2011 User's Guide. Apr. 30, 2010, http://images.autodesk.com/adsk/files/revit_architecture_2011_user_guide_en.pdf."
Search Report and Written Opinion for application No. 11201605983T dated May 13, 2018.
ArcGIS, "Deleting duplicate features". ArcGIS 9.3 Webhelp Topic. Last modified Jul. 6, 2009 Release 9.3. pp. 1-2.
Non-Final Office Action for U.S. Appl. No. 14/915,990 dated Jul. 20, 2018.
Supplementary European Search Report for application No. PCT/US2015011105 dated Apr. 4, 2018.
Xu, W et al., Joint-aware manipulation of deformable models. ACM Transactions on Graphics, Aug. 7, 2009, vol. 28, No. 3, pp. 1-9.
Search Report and Written Opinion for application No. 11201605818V dated Apr. 21, 2018.
International Search Report and Written Opinion for application No. 11201606050X dated Dec. 10, 2018.
Non-Final Office Action for U.S. Appl. No. 14/915,990, dated Jan. 30, 2019.

AUTOMATICALLY RESOLVING BOUNDARIES WITHIN AN ARCHITECTURAL DESIGN ENVIRONMENT

CROSS-REFERENCE TO RELATED APPLICATIONS

The present invention is a 35 U.S.C. § 371 U.S. National Stage of PCT PCT/IB14/01055 filed Mar. 24, 2014, claims the benefit of priority to PCT Application No. PCT/US13/50764, filed Jul. 16, 2013, and PCT Application No. PCT/US13/43735, filed May 31, 2013. The entire content of each of the foregoing patent applications are incorporated herein by reference.

BACKGROUND OF THE INVENTION

1. The Field of the Invention

The present invention relates generally to computer-aided design or drafting software.

2. Background and Relevant Art

As computerized systems have increased in popularity, so have the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers ("or designers") use a wide range of computer-aided design (CAD) software for designing the aesthetic as well as functional aspects of a given residential or commercial space. For example, a designer might use a CAD program to design fixtures and furniture for a particular office. The designer might then export the designs to be manufactured by a particular millwork facility.

While millwork is becoming a more common method of producing furniture, producing custom millwork furniture can be an expensive and time-consuming process. For example, conventional systems may require that custom furniture first be meticulously designed within a CAD program. Additionally, prior to designing the furniture or fixture within the CAD program, conventional systems may require that the specifications of the end product be exactly known ahead of time. For instance, a designer may need to know the exact dimensions of the object being designed, along with the finishing features, such as joint type, hinge type, door sizes, etc.

Additionally, in at least some conventional systems, a designer or manufacturer may incur great expense if any design changes are made after the initial CAD model is created. If, for example, a designer discovers that an initial measurement was incorrect, the designer may need to adjust or even recreate the entire design manually, taking into account the correct measurement. In addition, large cost can be incurred by simply switching from one millwork provider to another. For example, different millwork providers may use different joints, different hardware, different materials, materials of different dimensions, etc. As mentioned above, even slight changes such as these may require significant reworking of the CAD design.

Accordingly, there are a number of problems in the art relating to modeling architectural elements within a CAD program and later manufacturing those elements with a millwork facility.

BRIEF SUMMARY OF THE INVENTION

Implementations of the present invention overcome one or more problems in the art with systems, methods, and computer program products for automatically resolving anomalies on the boundaries of an architectural design. For example, in at least one implementation of the present invention, the millwork software can automatically identify an anomaly and determine one or more options for correcting the anomaly. The millwork software can then automatically resolve the anomaly or provide a user with one or more options for resolving the anomaly. One will appreciate that this can provide a number of advantages to designers incorporating particular finish details, such as millwork, into complex designs.

For example, a method in accordance with at least one implementation for automatically resolving joint anomalies within digital joints of an architectural design can include receiving a digital architectural design comprising a first furniture sub-component, a second furniture sub-component, and a third furniture sub-component. The method can then identify one or more joints between the various furniture sub-components. After identifying the joints, the method can include identifying an anomaly at the intersection of the joints. For example, the anomaly can be created when the joints fail to create a proper corner. The method can then automatically resolve the anomaly by changing the type of at least one of the joints within the digital architectural design.

In an additional or alternative implementation, a method can include analyzing a digital architectural design comprising one or more furniture sub-components. Each of the furniture sub-components can be associated with one or more independently executable software objects. The method can then include identifying various joints created by the one or more sub-components. After identifying the joints, the method can include identifying an anomaly at the intersection of the joints. For example, the anomaly can be created when the joints fail to create a proper corner. The method can further comprise accessing information provided by the one or more independently executable software objects. The accessed information can comprise one or more characteristics of the architectural design. Based upon the accessed one or more characteristics, the method can further involve determining one or more joint specifications that are compatible with the architectural design. Upon identifying compatible joints, the method can include automatically resolving the anomaly by changing the type of at least one of the joints to comprise a revised joint that conforms with the one or more joint specifications.

These and other objects and features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
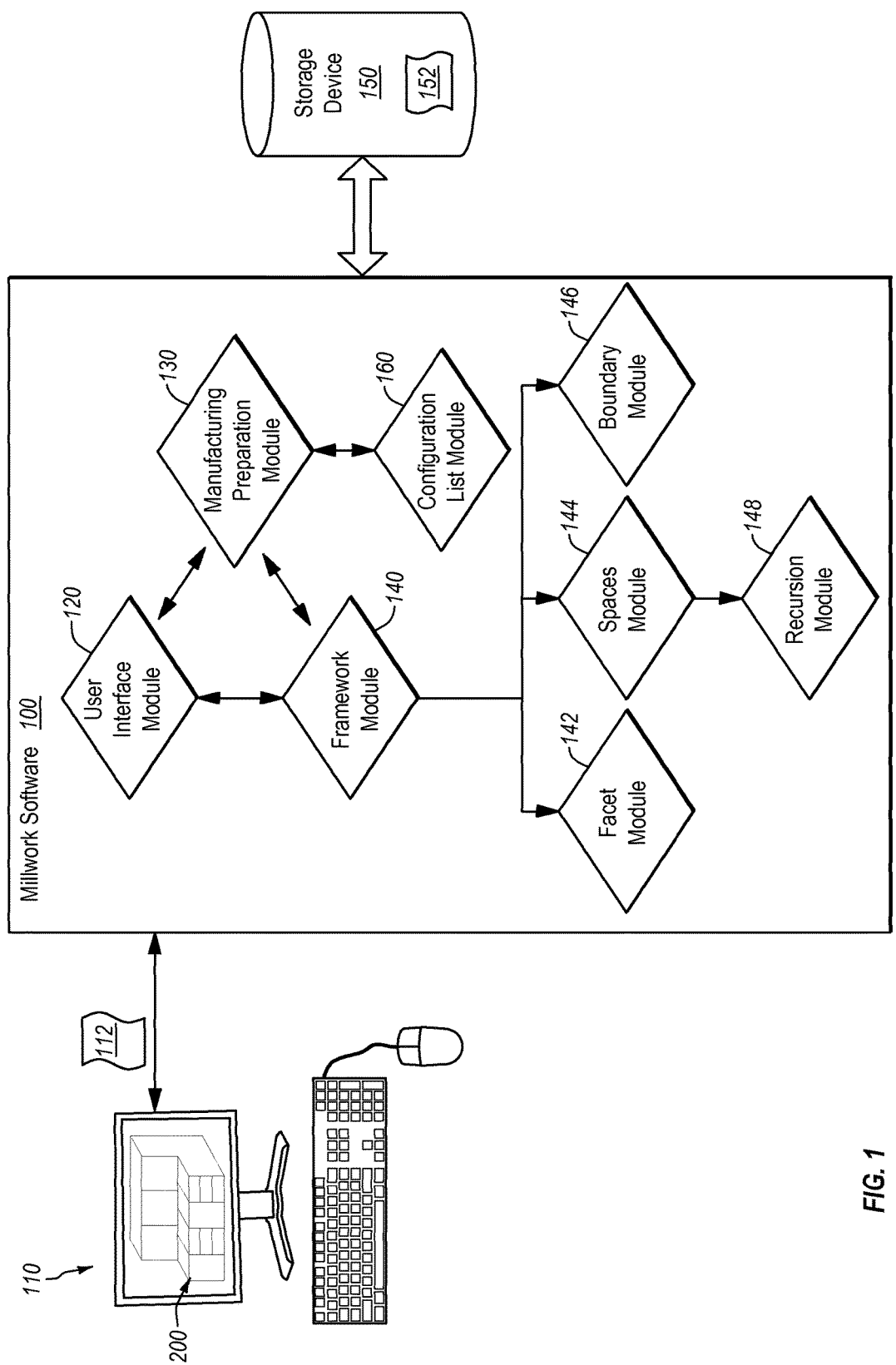
FIG. 1 is a schematic illustration of a system for designing and manufacturing an architectural element in accordance with an implementation of the present invention.

Implementations of the present invention extend to systems, methods, and computer program products for automatically resolving anomalies on the boundaries of an architectural design. For example, in at least one implementation of the present invention, the millwork software can automatically identify an anomaly and determine one or more options for correcting the anomaly. The millwork software can then automatically resolve the anomaly or provide a user with one or more options for resolving the anomaly. One will appreciate that this can provide a number of advantages to designers incorporating particular finish details, such as millwork, into complex designs.

For example, in at least one implementation of the present invention, a user can use an object oriented CAD program to create a spatial framework representative of an architectural element, for example, a desk with drawers. As the user is creating the framework of the desk with drawers, the CAD program can automatically create the surfaces and spaces that will make up the architectural element by analyzing the user's input. Additionally, the CAD program can identify potential uses for the spaces.

In at least one implementation, the one or more modules in the CAD program can identify and track space by assigning an independently executable software object to the space. As an independently executable software object, the space can have independent functions and variables associated with it. As needed, these functions and variables can automatically adjust the space, and in turn the planes that define the space in response to manufacturing specifications and manufacturer specific components.

Additionally, in at least one implementation, the present invention can automatically incorporate specific features and specifications from a third party manufacturer. In many cases, different manufacturers may use different hardware, different types of joints, and various other different manufacturing elements that each may require unique adjustments to an architectural design. For example, when manufacturing a kitchen, a first millwork facility may use a smaller sink with only a single basin, while a second millwork facility may use a larger sink with two basins. In at least one implementation, the architectural design can automatically adjust to incorporate either the smaller sink or the larger sink. One will appreciate that the ability to automatically incorporate third party features into an architectural design after the design is substantially complete can provide significant benefits.

Additionally, in at least one implementation, the present invention can aid in automatically resolving anomalies created. In at least one implementation, for example, one or more components of a CAD program can incorporate manufacturer specific components and specifications into the architectural design. For example, a particular manufacturer may use a specific type of carpentry joint. Some combinations of joints, however, may result in an impossible configuration or a configuration with an anomaly—often at a corner. In at least one implementation, the present invention can automatically identify an impossible or invalid configuration or a configuration that may create an anomaly, and then automatically resolve the conflict to create an architectural element with appropriate joints.

Implementations of the present invention can also allow a user to create a framework for an architectural element without knowing many of the end features that will be incorporated into the architectural element. For example, in at least one implementation, a user can create a framework for an entire kitchen without knowing the material that will be used, the dimensions of the resulting kitchen, the specific fixtures, and many other similar details. Once the digital framework is completed, a specific millwork facility can enter in the details of its materials, fixtures, configurations, and the actual specifications and/or dimensions of the end product; and the digital framework can automatically adjust to conform to the entered information.

Turning now to the Figures, FIG. 1 depicts an architectural schematic diagram of a computer system for designing and manufacturing an architectural element. In particular, FIG. 1 shows that an exemplary computer terminal 110 can be in communication with a millwork software application 100. The millwork software application 100 can be executed from the computer terminal 110, from a server (not shown) that the computer terminal 110 is accessing, or by using some other known method of execution. One will appreciate that the computer terminal 110 can comprise any computerized device that enables execution of computerized instructions, including any desktop, laptop, or mobile computing device.

FIG. 1 further shows that the millwork software application 100 can comprise a plurality of modules 120, 130, 140, 142, 144, 146, 148, 160 that are adapted to aid in designing a file for millwork. Each module 120, 130, 140, 142, 144, 146, 148, 160 may be representative of various programmatic functionality. For example, FIG. 1 depicts an implementation in which the millwork software application 100 comprises a user interface module 120, a manufacturing preparation module 130, a framework module 140, a facet module 142, a spaces module 144, a boundary module 146, a recursion module 148, a configuration list module 160, and a storage device 150. One will understand, however, that separating modules into discrete units is at least somewhat arbitrary and that modules can be combined, associated, or separated in ways other than shown in FIG. 1 and still accomplish the purposes of this invention. Accordingly, the particular modules 120, 130, 140, 142, 144, 146, 148, 160 of FIG. 1 are only shown for illustrative and exemplary purposes of at least one implementation.

In addition, FIG. 1 shows that the user interface module 120 can communicate with the computer terminal 110 through a series of data packets 112. For example, the user interface module 120 can display images and graphical controls to a user through a computer monitor and can receive input from a user through a keyboard and/or mouse. As a user creates and/or manipulates a particular framework of an architectural element, the user interface module 120 can communicate to—and receive instructions from—the framework module 140. FIG. 1 further shows that the framework module 140 can, in turn, communicate with the facet module 142, the spaces module 144, the boundary module 146, the recursion module 148, and the configuration list module 160.

Ultimately, either user interface module 120 or framework module 140 can communicate with manufacturing preparation module 130 to create a file that is prepared for use in a millwork facility. Additionally, FIG. 1 shows that the various modules can communicate with a storage device 150. The storage device 150 can contain, among other things, templates for a variety of different designs, completed designs that can be used on a standalone basis, or that incorporated into other designs. One will appreciate that the storage device 150 can also contain tool lists and/or manufacturing information specific to particular millwork facilities, and/or to particular design features.

One will appreciate in view of the specification and claims herein that the user interface module 120 provides to the user an option to create and make design changes to a framework 200. In at least one implementation for example, upon receiving a request for some modification, the user interface module 120 can communicate the request to the framework module 140. For example, a user may desire to design a desk for production at a millwork facility. Accordingly, a user may enter instructions into the computer terminal 110 to design and create the desk. The user interface module 120 can, in turn, communicate those instructions to the framework module 140.

Upon receiving the instructions, the framework module 140 can then communicate with the appropriate module to execute the request. For example, if the user desires to split the upper surface of the desk into two portions, the framework module 140 communicates with the facet module 142, which can modify and track surfaces within the framework 200. In contrast, and as will be understood more fully herein, if the user desires to split a space into two spaces, the framework module 140 can alternatively use the spaces module 144, which can modify and track spaces within the framework 200.

For instance, the spaces module 144 can allow the user to split the framework 200 in half and create one half of the desk that is dedicated to drawers, and another half that is open space for the user to place his or her chair and feet. Additionally, a user may use the spaces module 144 to split the framework 200 into any number of other divisions, for example thirds. Of course, one will appreciate that the divisions do not need to be proportionally equal. For instance, the spaces module 144 can allow a user to move the single split mentioned above such that the drawers of the desk only take up one-third of the framework, while the leg space takes up the remaining two-thirds.

In at least one implementation, the facet module 142 can perform similar functions on surfaces within the framework 200. For example, the facet module 142 can be used to create a split in the front surface of the desk to create doors for a cupboard. Similar to the spaces module 144, the facet module 142 can also be used to create split surfaces of different sizes.

In addition, the framework module 140 can use the boundary module 146 to automatically check joints within the framework 200 (FIGS. 2A-2B) to determine if any "anomalies" exist. For example, if a user specifies that particular joint should be a miter joint, the boundary module 146 can analyze all of the joints within the desk to determine whether the remaining boundaries properly form around the entire desk. If the boundary module 146 detects any anomalies, (e.g., improperly overlapped joints, or other inappropriate positioning), the boundary module 146 can automatically resolve them and create proper joints throughout the desk.

Once the user has finished designing the architectural element (in this case a desk), the manufacturing preparation module 130 can receive millwork facility specific details from the configuration list module 160, and can receive specifications relating to the final details of the architectural element. For example, a particular millwork facility may use a dovetail joint to assemble the drawers of the dresser. Additionally, the millwork facility may use a particular type of wood that comprises a specific thickness. Upon receiving this information from the configuration list module 160, the manufacturing preparation module 130 can automatically adjust the framework 200 of the desk to create a design that incorporates the dovetail joint, wood type and wood thickness, and that can be manufactured at the millwork facility. In contrast, in at least one implementation, the manufacturing preparation module 130 may not make any changes to the actual framework 200, but instead the manufacturing preparation module 130 may make the necessary changes to the actual manufacturing code (e.g., CNC code).

Similarly, the manufacturing preparation module 130 can automatically adjust the framework 200 of the desk to incorporate specific third party features. For example, a designer may originally design a desk without knowing the specific handles that a particular millwork facility uses for the drawers. In at least one implementation, the configuration list module 160 can receive a list of components and specifications that the particular millwork facility uses. The manufacturing preparation module 130 can then automatically incorporate those components and specifications of the millwork facility into the design.

For example, the millwork facility may use handles that require two pre-drilled screw holes spaced 10 cm apart with the midpoint between the holes being centered on the drawer face. Upon receiving this information from the configuration list module 160, the manufacturing prepared module 130 can automatically incorporate the two screw holes for the handle into the desk drawer. Additionally, the manufacturing preparation module 130 can automatically incorporate the holes into a computer numerical code ("CNC") file that the particular millwork facility can use to automate the manufacture of the desk.

In at least one implementation, the manufacturing preparation module 130 can also automatically prepare the same framework 200 to be manufactured in any number of different millwork facilities, even though each facility may have specific manufacturing requirements. Specifically, once a particular framework 200 has been designed, the framework 200 can be used at a number of different millwork facilities as long as the configuration list module 160 has access to a configuration list 152 that is associated with the specific facility. The configuration list 152 can be stored in the storage device 150, accessed through a network connection, or otherwise made available to the millwork software 100.

Figure 2A:
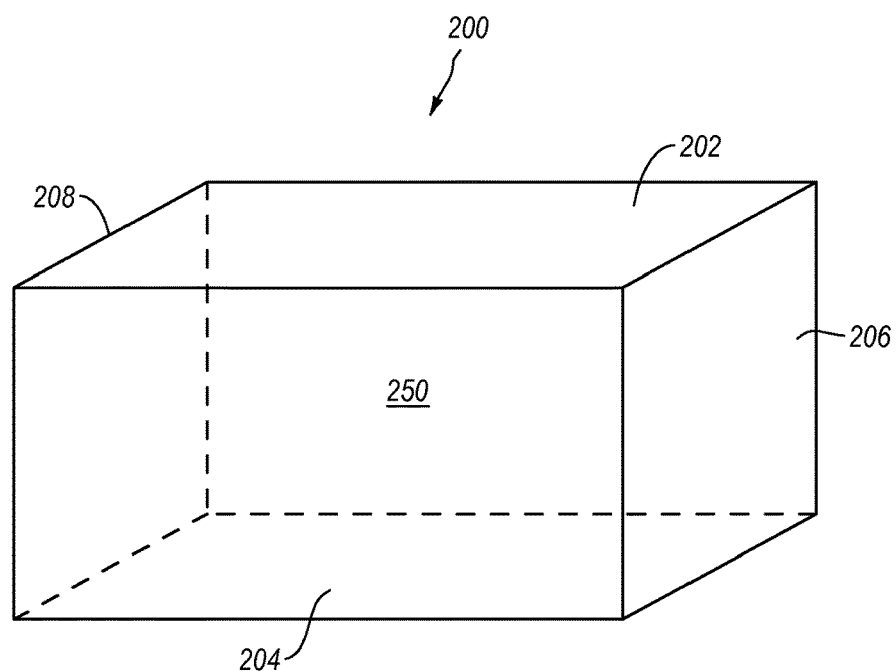
FIG. 2A illustrates a spatial framework created in accordance with the inventive system illustrated in FIG. 1.
Figure 2B:
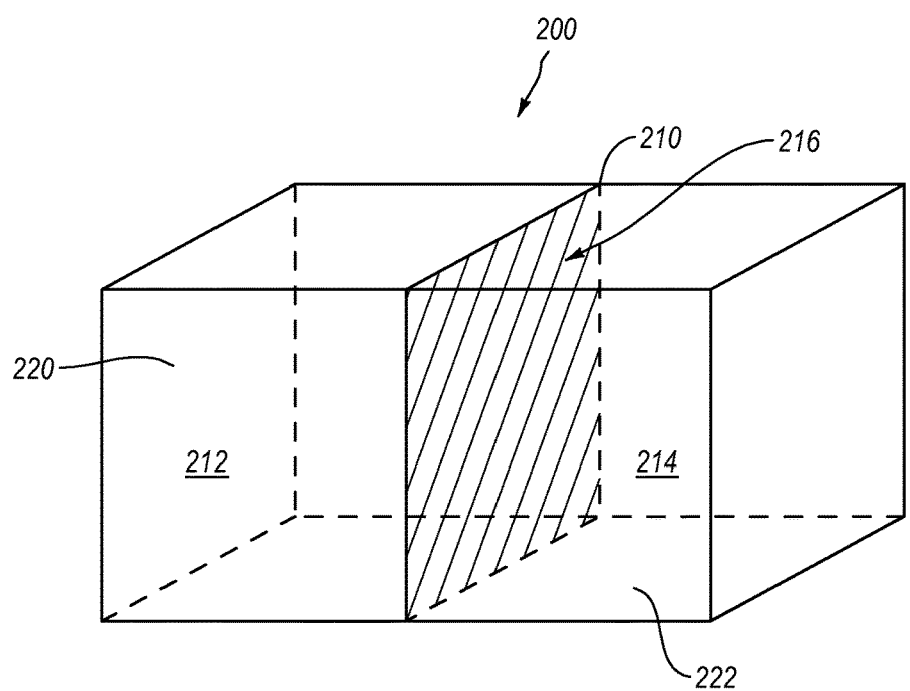
FIG. 2B illustrates the spatial framework of FIG. 2A, after a designer has inserted a cube splitter in accordance with an implementation of the present invention.
Figure 2C:
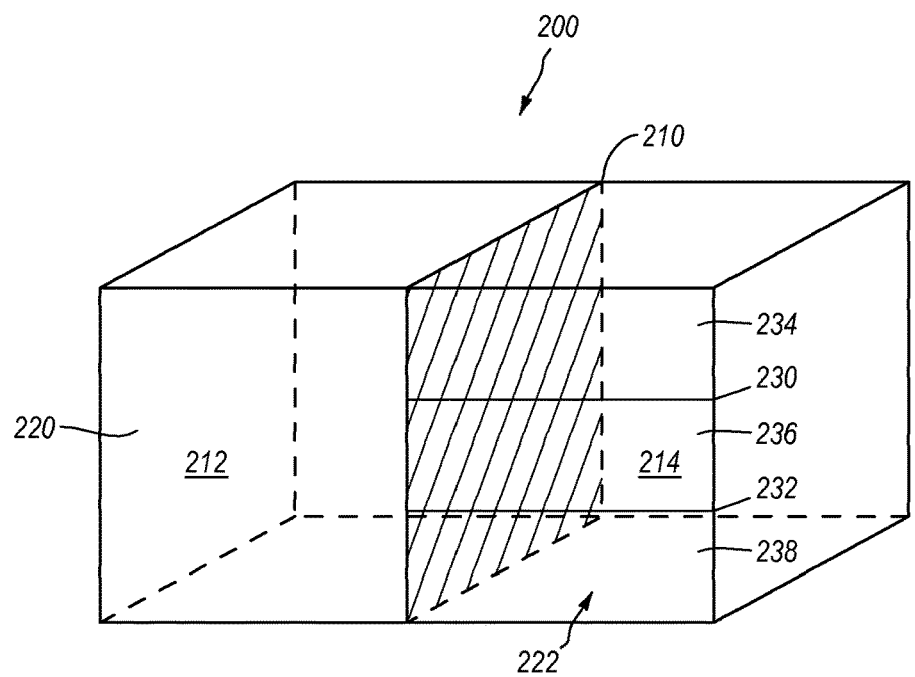
FIG. 2C depicts the spatial framework of FIG. 2B upon implementation of one or more facet splitters in accordance with an implementation of the present invention.

FIGS. 2A-2C depict various implementations of a spatial framework 200. As shown in FIG. 2A, the spatial framework 200 can initially comprise a simple cube. In at least one implementation, the millwork software 100 can comprise a plurality of different simply shaped frameworks 200 that can be used as starting points for designing an architectural element. In general, the spatial framework 200 can be a computer model of an architectural element that captures the design intent of a user.

In particular, the spatial framework 200 can capture data relating to the outline of an architectural element and the position of components in the element with respect to each other. To accomplish this, the spatial framework 200 can comprise a space 250 that is associated with an independently executable software object. The independently executable software object can assist in tracking and managing the various components of the designed architectural element. In at least one implementation, the space 250 and independently executable software object are both managed by the spaces module 144.

By way of explanation, an independently executable software object comprises a set of computer-executable instructions used in object-oriented program code, and which relate to a particular physical component or feature. In addition, software objects can be interrelated via parent/child dependency relationships where changes in a parent object flow through to a child object and vice versa. For example, a software object created for a table may have several child objects for each leg.

In other cases, the software objects can be related to other software objects that represent physically proximate components (e.g., a wall object that is positioned next to the table object). For example the above-mentioned table software object and leg software objects can independently execute in a correlated fashion to ensure each corresponding physical component (i.e., the table top, or the table legs) is positioned appropriately, or otherwise colored and designed consistent with the user's specifications. For example, a leg software object can identify that it's location next to a wall renders a physical leg unnecessary, and accordingly can automatically incorporate a bracket to attach directly to the wall in place of a physical leg.

FIG. 2A also depicts that the framework 200 can comprise "facets" 202, 204, 206 and boundaries 208. By way of explanation, "facets" 202, 204, 206 represent surfaces within the framework. Facets 202, 204, 206, however, may not always correlate to surfaces within the finished architectural element. For example, facets 202, 204, 206 may only be quasi-two-dimensional because they can comprise a specified thickness. In some cases, a user can set the thickness of a particular facet to be zero. As a result the facet can still be a part of the framework 200 but it will not be a part of the finished architectural element. "Boundaries," on the other hand, represent lines where facets meet. In at least one implementation, a specific boundary's location can be defined with respect to the other boundaries that the specific boundary intersects.

FIG. 2B depicts an implementation of a framework 200 that has been bisected by a "cube splitter" 210. As depicted, the cube splitter 210 splits or divides space 250 in half creating two new spaces 212 and 214, which spaces may or may not comprise the same dimensions. In at least one implementation, the creation of two new spaces 212, 214 also results in the creation of two new independently executable software objects (no shown), which are associated with each space 212, 214. It should be understood that while cubes and squares are used to illustrate embodiments of the present invention within this application, in at least one implementation, many different shapes and configurations of a framework 200 can be used, and it should further be understood that a cube splitter can divide spaces into non-equal portions.

In particular, in at least one implementation, the newly created independently executable software objects associated with spaces 212 and 214 may each inherit the parameters and characteristics of the independently executable software object that was originally associated with space 250. In at least one implementation, due to this inheritance, if space 250 originally comprises a set of drawers, after the split, spaces 212 and 214 can each comprise separate, independently executable software objects that correspondingly comprise a set of drawers that mirror the original drawers of space 250.

The cube splitter 210 can also create a new facet 216 within the framework 200 and a plurality of new facets (for example 220, 222) on each external surface of the framework 200. As mentioned above, the new facets 216, 220, 222 can each comprise a unique thickness, such that the facets 216, 220, 222 comprise physical surfaces within the architectural element. Similarly, or alternatively, the facets 216, 220, 222 can comprise thicknesses of zero, resulting in the facets 216, 220, 222 only being represented within the framework 200 but not within the finished architectural element.

FIG. 2C depicts the framework 200 of FIG. 2B, albeit comprising two facet splitters 230, 232. As depicted, the facet splitters 230, 232 can split facet 222 (created from splitting facet 204) into three new facets 234, 236, 238. In at least one implementation, a facet splitter 230, 232 is configured to split only facets, such as facets 220, 222, 234, 236, 238. This is as opposed to a cube splitter 210, which can be configured in at least one implementation to split an entire space 250 (i.e., into spaces 212, 214, FIGS. 2B-2C). In addition, in at least one implementation, the new facets 234, 236, 238 remain associated with space 214, and thus can be associated with the independently executable software object that is associated with space 214.

Figure 3:
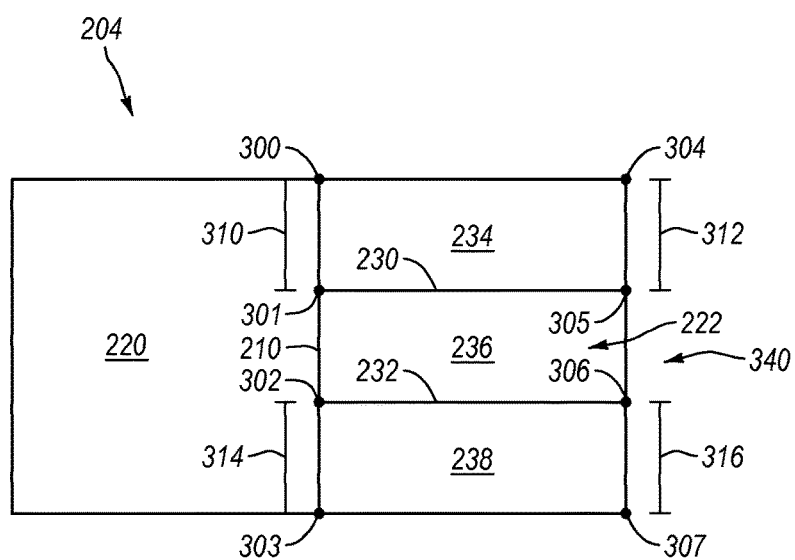
FIG. 3 depicts a planar view of a spatial framework created in accordance with an implementation of the present invention.

FIG. 3 depicts a quasi-two-dimensional view of front face 204 of the framework 200 from FIG. 2C, after various space and facet splitting. As mentioned previously, the view is quasi-two-dimensional because each facet can in fact comprise a thickness, when so set by the user. Accordingly, FIG. 3 shows facet 220, which was formed by the placement of cube splitter 210, and facets 234, 236, and 238, which were formed by the placement of facet splitters 230 and 232. Additionally, FIG. 3 depicts the end point 300, 301, 302, 303, 304, 305, 306, 307, 320, 322 of each boundary within the front face of the framework. In at least one implementation, a user can interact with the framework 200 through either a three-dimensional view (e.g., FIGS. 2A-2C) or through a quasi-two-dimensional view (e.g., FIG. 3). In either view, the location and behavior of the facets can be managed by the facet module 142.

In at least one implementation, the location and positioning of the cube splitters 210 and facet splitters 230, 236, 238 within the framework can be tracked with respect to the end points 300, 301, 302, 303, 304, 305, 306, 307, 320, 322 of each respective facet splitter 230, 236, 238 or cube splitter 210, and in particular, where those end points intersect other boundaries. In at least one implementation, the location of the end point intersections can be tracked as a finite distance or as a proportion of the total length of the respective boundary.

For example, FIG. 3 shows that facet splitter 230 comprises end points 301 and 305. In at least one implementation, the location of facet splitter 230 can be designated as end point 301 being located distance 310 from the top of cube splitter 210, and end point 305 being located distance 312 from the top of side boundary 340. Similarly, the location of facet splitter 232 can be designated as end point 302 being positioned ⅓ up the length of cube splitter 210, and similarly, end point 306 being location ⅓ up the length of side boundary 340.

One will understand that using a finite length or a proportional length can impact the future millwork of the architectural element. For example, if a user resizes an item framework 200 by expanding the framework in all directions, then facet splitter 230 can still be located distance 310 and 312 from the top of cube splitter 210, and from the side boundary 340 respectively. Facet splitter 232, on the other hand, can change in absolute position such that each end point 302, 306 is ⅓ up the length of their respective boundaries 210, 340 (e.g., between points 300/303 and/or 304/307), without regard to the actual length of boundaries 210 and 340.

In at least one implementation, the framework 200 can be shrunk so much that absolute distance 310 and distance 312 exceed ⅔ of the total length of boundaries 210 and 340 respectively. One will understand that this can cause facet splitter 230 to overlap facet splitter 232. In this situation, the framework module 140 can automatically determine that either facet splitter 232 or facet splitter 230 should automatically be removed leaving only a single facet splitter 230 or 232, but not both. For example, in at least one implementation, a user can set an option to automatically give fixed lengths 310, 312 priority over proportional lengths 303, 316, or to automatically give proportional lengths 303, 316 priority over fixed lengths 310, 312.

Additionally, a user may be able to set an option that gives priority to the first facet splitter 230, 232, or to cube splitter 210 created over subsequent facet splitters 230, 232, or to cube splitter 210. In contrast, a user may be able to set an option that gives priority to the last facet splitter 230, 232, or to cube splitter 210 created over previous facet splitters 230, 232, or to cube splitter 210. Further, in at least one implementation, a user can specifically designate that a particular facet splitter 230, 232, or cube splitter 210, should be given priority over other facet splitters 230, 232, and/or cube splitters 210.

Allowing a user to determine whether a facet splitter or cube splitter should be located on a proportional distance basis, or on an absolute distance basis, can provide the user with significant control over how an architectural element can be resized and manipulated. Additionally, allowing a user to determine the priority that particular cube splitters and/or facet splitters can be given when the splitters conflict with each other allows a user to have control over the final configuration of an architectural element that has been resized.

Figure 4A:
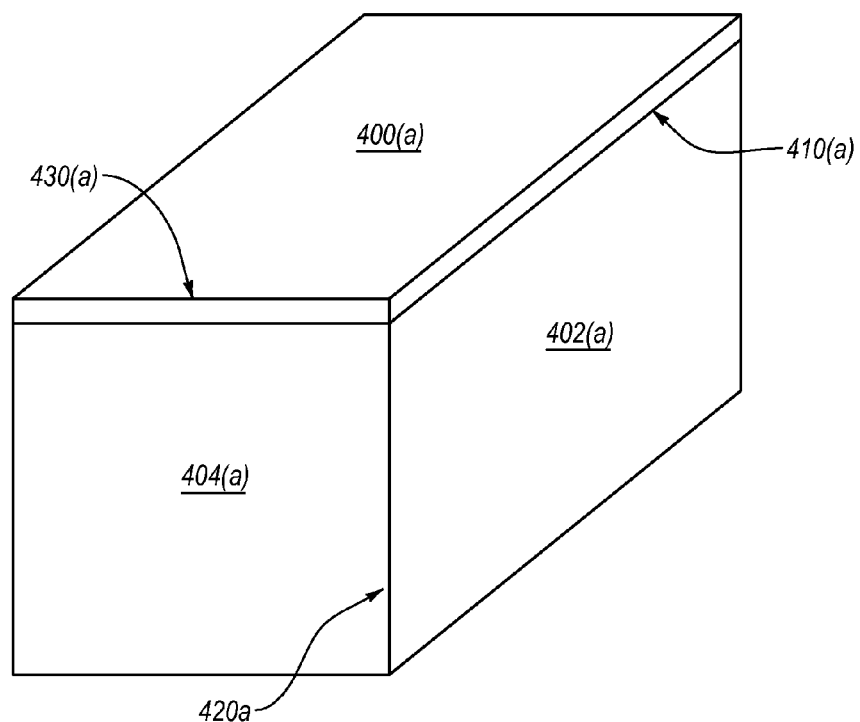
FIG. 4A depicts a spatial framework created in accordance with the present invention in which there are no joint anomalies.
Figure 4B:
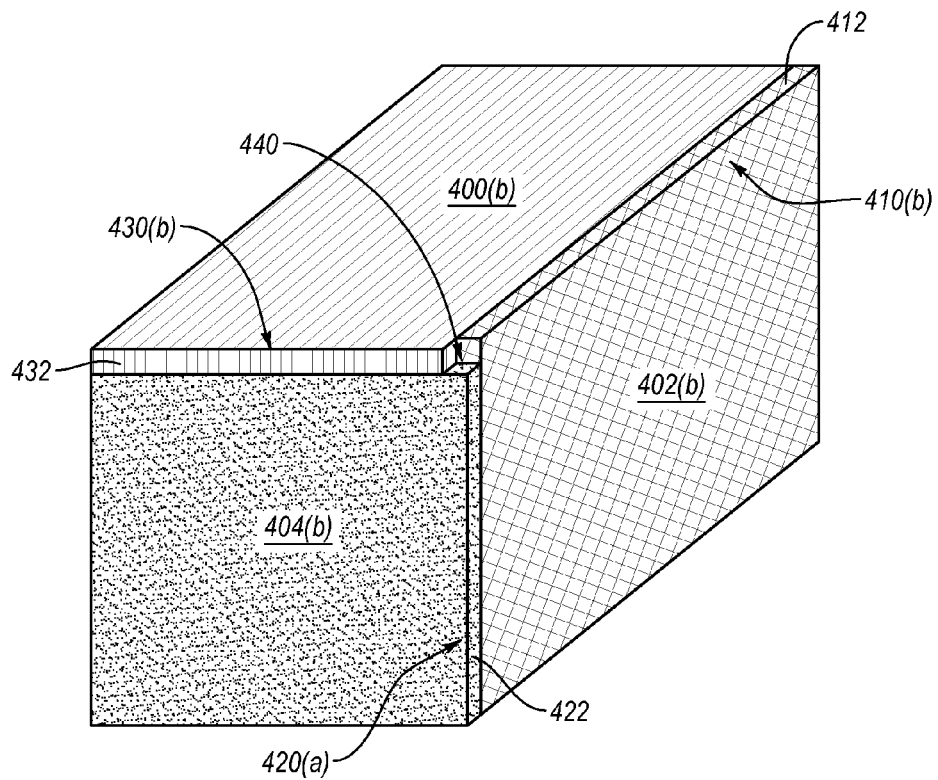
FIG. 4B depicts a similar spatial framework as that of FIG. 4A, albeit with joint anomalies.

FIGS. 4A and 4B depict various implementations of boundary detection and correction. In at least one implementation, as a user designs a framework 200 for a particular architectural element, the user is able to specify the type of joints that the user desires to join particular surfaces of the architectural element. In contrast, in at least one implementation, a particular millwork facility may use a specific joint type in some architectural elements. As such, a user may be able to adjust or specify select joints, while others are fixed to thereby accommodate the specifications of the millwork facility. Thus, as the user creates an architectural design, the boundary module 146 can analyze the design to verify that no anomalies exists within the various joints, and that the joints are consistent with the given facility's specifications.

By way of explanation, "anomalies" can be created when non-compatible joint types meet at an intersection. In at least one particular implementation, an anomaly includes a portion of an architectural design that fails to form a proper corner. As will be explained further below, in some implementations, certain joint combinations will create a gap in a location that should normally comprise a finished corner. Incompatible joints may also create anomalies that do not exist solely as incorrectly formed corners. For example, an anomaly can also comprise a corner that is not symmetric with at least one other corner of an architectural design of a piece of furniture. In this case, the corner is an anomaly because it does not match with the rest of the design.

As an example, FIG. 4A depicts a simple architectural element (e.g., a box) that comprises an upper surface 400(*a*) (or upper "sub-component"), a side surface 404(*a*) (or side "sub-component"), and a front surface 402(*a*) (or front "sub-component"). As depicted, the front surface 402(*a*) and the side surface 404(*a*) meet each other at miter joint 420(*a*). FIG. 4A further shows that the side surface 404(*a*) and the upper surface 400(*a*) meet each other at joint 430(*a*) where upper surface 400(*a*) overlaps side surface 404(*a*), and upper surface 400(*a*) and front surface 402(*a*) meet each other at joint 410(*a*) where upper surface 400(*a*) overlaps front surface 402(*a*). In at least one implementation, the boundary module 146 can analyze the joints of FIG. 4A and determine that the above-recited joints do not create any anomalies, and can thus be left as they are.

In contrast to FIG. 4A, however, FIG. 4B illustrates an alternative illustration of the same architectural element shown in FIG. 4A, albeit one in which the joints do create an anomaly (440). In particular, FIG. 4B shows an alternate arrangement of surfaces in which top surface 400(*b*) is placed on an inside surface of surface 402(*b*), and hence meets front surface 402(*b*) at joint 412 where front panel 402(*b*) overlaps the front edge of upper surface 400(*b*).

Additionally, the front surface 402(*b*) meets side surface 404(*b*) at joint 422 where side surface 404(*b*) overlaps the side edge of front surface 402(*b*). Further, FIG. 4B shows that the side surface 404(*b*) meets upper surface 400(*b*) at joint 432 where upper surface 400(*b*) overlaps side surface 404(*b*). As shown, this particular selection of joints creates an anomaly 440.

In at least one implementation, the boundary module 146 can analyze the joints of FIG. 4B and identify the presence of an anomaly 440. For example, the boundary module 146 can access a database that contains a list of joint configurations that have been predetermined to create an anomaly, when these surfaces 400(*a* & *b*), 402(*a* & *b*), and 404(*a* & *b*) are arranged in this alternate configuration. If the boundary module 146 detects that the arrangement of FIG. 4B is already listed as an anomaly within the database list in storage device 150, the boundary module 146 can then immediately determine that an anomaly exists without any additional calculations or analysis.

In another implementation, the boundary module 146 can analyze each of the joints within the architectural design, and based upon the analysis identify that an anomaly exists. For example, the boundary module 146 can determine that a particular configuration of joints does not create a correct corner where each of the joints meets, based on the arrangement of surfaces 400(*b*) and 402(*b*) relative to the edges of surface 402(*b*). As previously discussed with respect to FIG. 4B, for example, instead of creating a correct corner, an empty gap (i.e., anomaly 440) is present where the corner should exist. The boundary module 146 can be adaptive to similarly identify anomalies in situations where more than three surfaces are meeting at a point, or when multiple surfaces meet at angles that do not necessary create a corner. Further, in at least one implementation, the boundary module 146 can identify an anomaly by identifying a corner that is not symmetric with at least one other corner in a particular design.

Once an anomaly (e.g., 440) is identified, the boundary module 146 can resolve the anomaly by automatically adjusting the joints. For example, in FIG. 4B, the boundary module 146 can change boundary 422 such that the front panel 402(*a* & *b*) is rearranged to overlap the side panel 404(*a* & *b*) (as in FIG. 4A), and by correspondingly rearranging surfaces 400(*a* & *b*) and/or 402(*a* & *b*). One will appreciate that this change in the joint configuration will resolve the anomaly. In at least one implementation, after identifying a correction to the anomaly, the user interface module 120 will display to the designer a depiction of architectural design, including the corrected joint, and provide a prompt for the user to accept or reject the change. If the user rejects the change, the boundary module 146 can re-analyze the architectural design, and present one or more additional correct options for the user to choose between.

In determining what boundaries to change, the boundary module 146 can operate such that the joints specified by a configuration list from a millwork facility are preserved while other joints are changed. In contrast, the boundary module 146 can adjust the joints such that the most recently specified joint is preserved and others are changed. Alternatively, the boundary module 146 can change joints such that the earliest specified joints are preserved and the most recently specified joints are changed. In addition, in at least one implementation, a user can specify that a particular joint be given priority over other joints. For example, upon detecting an anomaly (e.g., 440), the user interface module 120 can prompt a user to select a preferred joint that will be preserved by the boundary module 146. Accordingly, one or more implementations present a variety of different procedures for determining which joints to preserve and which joints to change.

As an additional example of a method for determining which joints to change, the boundary module 146 can automatically analyze the architectural design and determine a preferred joint type based upon other joints present throughout the architectural design. In analyzing the architectural design, the boundary module 146 can analyze joints associated with multiple distinct components within the design, joints adjacent to the anomaly, joints on the same face as the anomaly, or joints otherwise present within an architectural design.

For example, a particular architectural design can comprise a desk, a shelf, and a filing cabinet. The boundary module 146 may determine that the desk, for example, comprises an anomaly (e.g., 440) created by an improper joint configuration. In at least one implementation, the boundary module 146 can then automatically analyze the joints that are used within the desk, the shelf, and/or the filing cabinet to determine if a particular joint type is more common. Similarly, the boundary module 146 can analyze the desk to determine the type of joints that are adjacent to the joint that is being changed, and identify the adjacent joint types as being preferred. Additionally, if the anomaly is along the writing surface of the desk, the boundary module 146 can analyze the other joints that surround the writing surface to identify a preferred joint.

One will appreciate that this can provide a visual benefit by keeping joint placement consistent. For example, it may be more visually appealing for all of the joints along the top of the desk to be of the same type. Once a preferred joint type is identified (whether by the user, or based on an automatic configuration), the boundary module 146 can correct the anomaly within the desk while preserving any joints in the desk that are of the preferred type, or by changing one or more joints to match the preferred type.

Additionally, in at least one implementation, when correcting anomalies within the joints of an architectural design, the boundary module 146 can communicate with one or more independently executable software objects that are associated with the surfaces 400, 402, 404 of the design, the joints 410(*a* & *b*), 420(*a* & *b*), 430(*a* & *b*) of the design, and/or with independently executable software objects that are otherwise associated with the design. The independently executable software objects can provide information relating to joints that can be incorporated into the design and/or joints that cannot be incorporated into the design.

The independently executable software objects, in turn, may also indicate preferred joint configurations that can be used to resolve anomalies. Additionally, the independently executable software objects can provide information such as available materials, dimensions, strength requirements, and other related characteristics that can be used to determine which joints should be used. For example, if a stone, such as granite or marble, is being used as a material, the user may desire to use an overlap joint to better display the stone grain. Accordingly, in the case, an independently executable software object can indicate that the material is stone; and, as a result, the boundary module 146 can use this information to determine that an overlap joint is preferred.

In at least one implementation, the boundary module 146 can allow a millwork facility to specify particular types of joints for constructing an architectural element. A designer, therefore, can design the complete architectural design without being aware of the particular specifications of the millwork facility that will manufacture an architectural element. Additionally, a designer can create a single architectural design that the manufacturing preparation module 130 can automatically adjust, as dictated by a millwork facility specific configuration list provided to the configuration list module 160. In this way a single architectural design can be used by a variety of different millwork facilities, each of which requires unique joints and specifications.

Once an architectural element has been sufficiently designed within a framework 200, the manufacturing preparation module 130 can prepare the framework 200 for actual production at a millwork facility. For example, the configuration list module 160 can provide the manufacturing preparation module 130 with the various specifications, hardware components, and other manufacturing constraints of a particular millwork facility. In at least one implementation, this can include adjusting the framework 200 to incorporate a specific material type, or a specific material thickness, adjusting the framework 200 to fit within a particular space, incorporating the appropriate third party hardware into the design, incorporating the appropriate attachments into the framework, or adjusting some other portion of the framework 200.

Figure 5A:
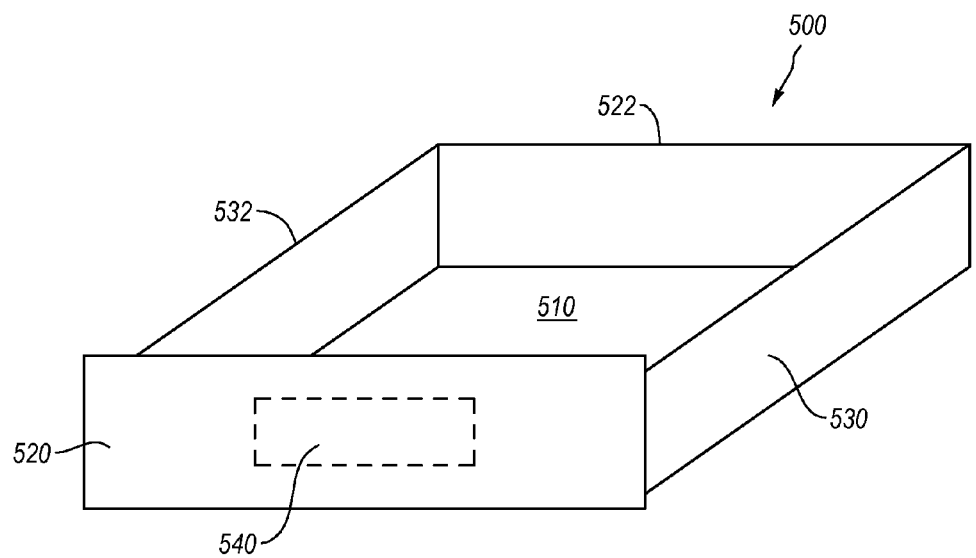
FIG. 5A depicts an architectural design for a drawer in accordance with an implementation of the present invention.

For example, FIG. 5A depicts a portion of a framework 200 representing a drawer 500. Specifically, the depicted drawer 500 comprises a backside 522, a left side 532, a right side 530, a front side 520, and a bottom 510. In at least one implementation, the manufacturing preparation module 130 can identify that a front side 520 comprises a third party hardware interface area 540 (i.e., a location where a handle can be attached). In response, and to identify the third party hardware interface area 540, the manufacturing preparation module 130 can query the configuration list module 160 to identify specifications for a handle that is used by a millwork facility of interest.

In at least one implementation, the configuration list module 160 can access a plurality of different configuration files from different millwork facilities stored on a storage device 150. A designer or user can indicate to the millwork software 100 the particular millwork facility that the user intends to use. The configuration list module 160 can then access the appropriate configuration list 152 (see FIG. 1) that is associated with the identified millwork facility. The various configuration lists 152 can be stored within the storage device 150.

Figure 5B:
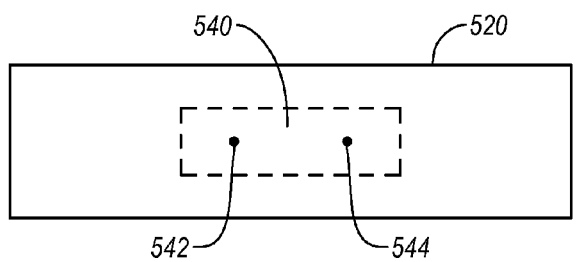
FIG. 5B depicts a front face of the drawer depicted in FIG. 5A in accordance with an implementation of the present invention.

Once the configuration list module 160 provides the manufacturing preparation module 130 with the appropriate information, the manufacturing preparation module 130 can identify that the desired millwork facility utilizes handles that are anchored by two screws a certain distance apart. Based upon this information the manufacturing preparation module 130 can place two holes that are the appropriate distance apart within the third party hardware interface area 540 of the front side 520 as shown in FIG. 5B. In at least one implementation, the manufacturing preparation module 130 automatically incorporates the changes into a CNC file, or some other format that the desired millwork facility can interpret.

In at least one implementation, instead of selecting a particular millwork facility, the millwork software 100 can provide the user with a selection of all of the available handles. Once a user selects a desired handle, the millwork software 100 can provide the user with a list of the millwork facilities that provide the selected handle. Similarly, in at least one implementation, the user can select a generic handle that can be replaced by an available handle at whatever millwork facility ends up performing the work. Accordingly, the millwork software 100 provides a user with numerous methods for incorporating third party hardware into a particular design.

In addition to incorporating millwork facility specific components into an architectural design, in at least one implementation the manufacturing preparation module can incorporate millwork facility specific joint details into an architectural design. For example, the configuration list module 160 may identify that a particular millwork facility uses a groove joint to attach the bottom 510 of a drawer 500 to the right side 530 of the drawer 500. Upon receiving this information from the configuration list module 160, the manufacturing preparation module 130 can automatically incorporate the groove joint 532 into the right side 530 of the drawer 500.

Figure 5C:
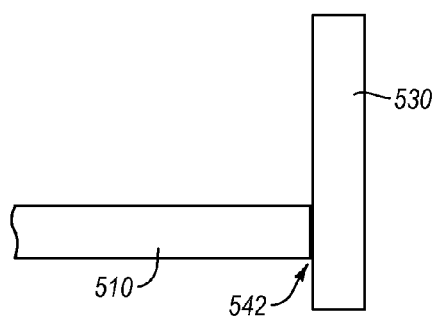
FIG. 5C depicts a drawer bottom and side, albeit without a connecting joint detail in accordance with an implementation of the present invention.
Figure 5D:
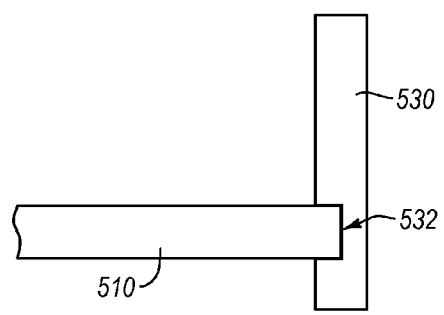
FIG. 5D depicts the drawer bottom and side of FIG. 5C, now with a joint detail, in accordance with an implementation of the present invention.

FIG. 5D depicts the drawer of FIG. 5C after the manufacturing preparation module 130 has applied the specified connection type 532 to the drawer. For example, the connection 532 can comprise the bottom side 510 being inset into the right side 530. Upon determining and applying the proper connection type, the manufacturing preparation module 130 can create a file that will direct a millwork facility to cut a groove into the side wall of right side 530, wherein the groove is cut at such a depth and location that the joint functions as designed in FIG. 5D.

In at least one implementation, the configuration list 152 provided by the configuration list module 160 can include, among other things, the particular specifications and types of hardware that a particular millwork facility uses, the type of materials and thicknesses of materials that a millwork facility uses, and the types of joint details that the millwork facility uses. Additionally, the configuration list 152 can include information associating at least a portion of the items within the list with particular elements of architectural designs. For example, the configuration list 152 can contain an entry that associates a particular handle with any interface 540 on a drawer front panel 520. Similarly, the configuration list 152 can comprise an entry that associates a groove joint with any interface where a right side drawer panel 530 meets a bottom drawer panel 510.

Additionally, in at least one implementation, a configuration list 152 can provide multiple options for, among other things, hardware components, materials type and thickness, and joints. For example, a particular millwork facility may have a plurality of different drawer handles available for use. The configuration list 152 can contain specifications and information about each available handle. The manufacturing preparation module 130 can then provide a user with various options to determine which components and specifications should be incorporated into a corresponding CNC file.

Figure 5E:
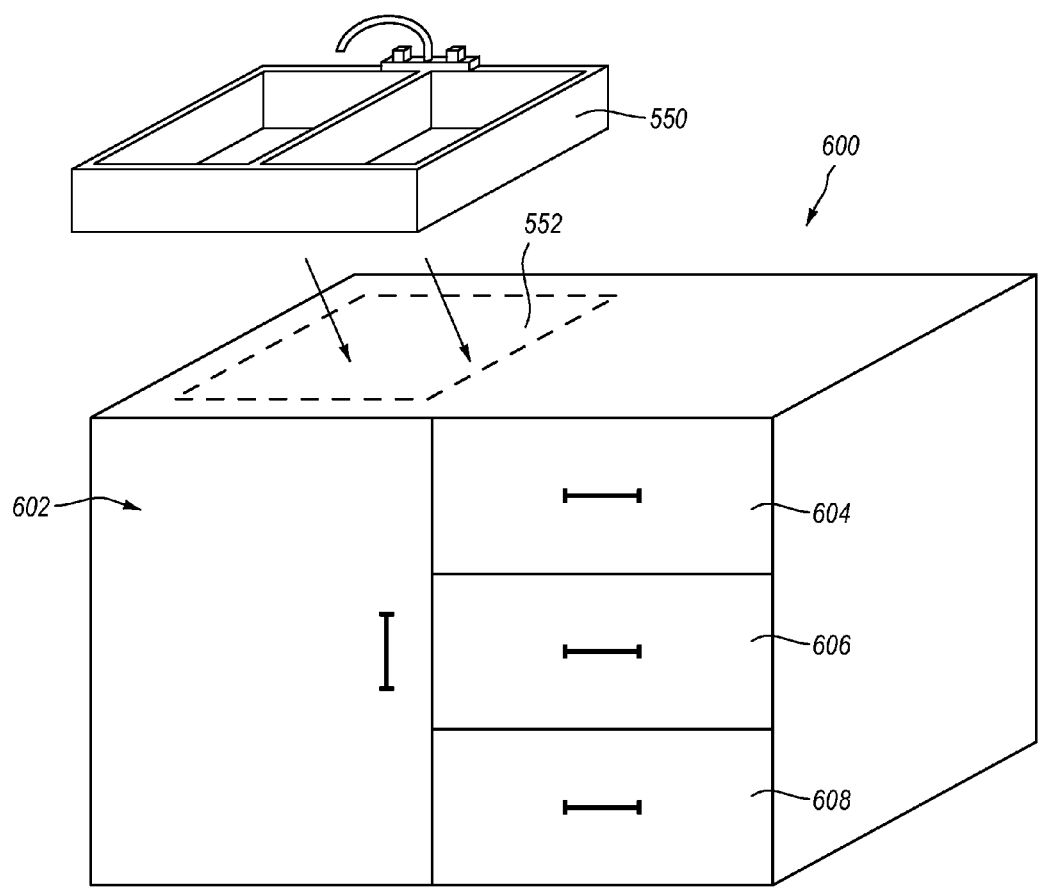
FIG. 5E depicts a storage unit and an oversized sink in accordance with an implementation of the present invention.

FIG. 5E depicts a storage unit 600 that has been designed with an interface 552 for a sink 550. The depicted storage unit 600 comprises a cupboard 602 and three drawers 604, 606, 608. In at least one implementation, a designer can design the storage unit 600 without knowing the specifications for the sink 550 that will eventually be included with the storage unit 600. Additionally, the designer can design the storage unit 600 with the intent that the storage unit 600 be manufactured by a plurality of different millwork facilities, with each millwork facility using a unique sink 550.

Figure 5F:
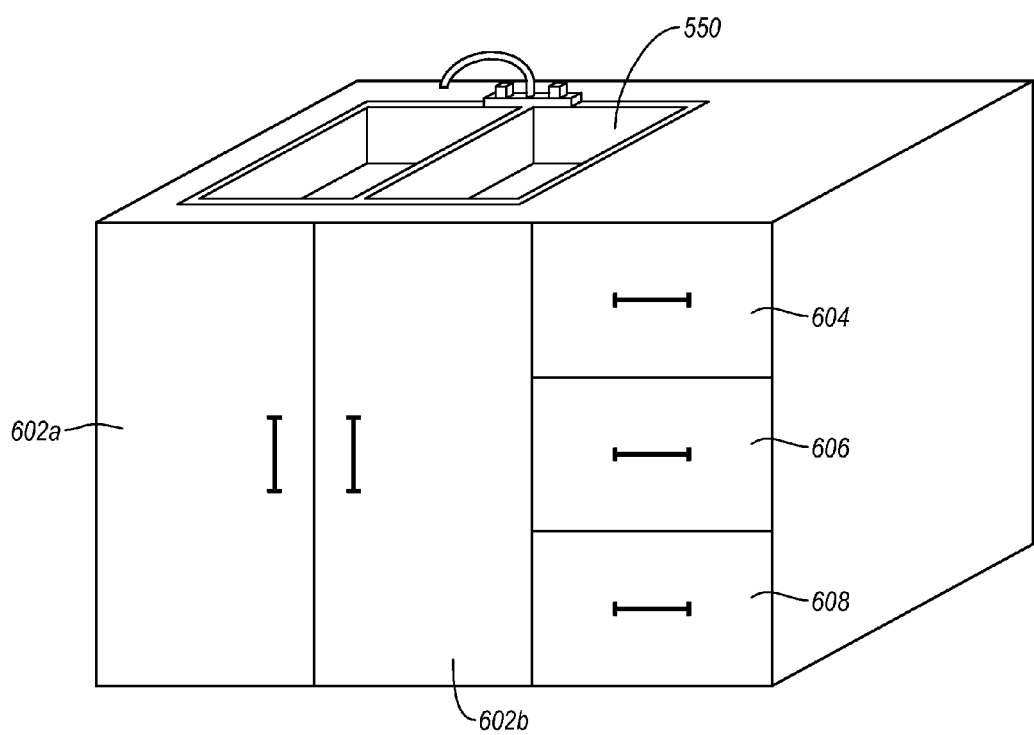
FIG. 5F depicts a resized storage unit and an inset sink as depicted in FIG. 5E in accordance with an implementation of the present invention.

The configuration list module 160 can provide the manufacturing preparation module 130 with the appropriate specifications for the depicted sink 550. As depicted in FIG. 5E, for example, the sink 550 is too large for the specified interface 552. In at least one implementation, the manufacturing preparation module 130 can resolve this discrepancy by automatically adjusting the size and configuration of the storage unit 600. For example, FIG. 5F depicts an adjusted storage unit 600 that now includes the sink 550.

In the illustrated case, the manufacturing preparation module 130 lengthened the cupboard 602 of the storage unit 600 such that it now includes two cupboard doors 602a and 602b. The manufacturing preparation module 130 also narrowed the drawers 604, 606, 608 to compensate for the enlarged cupboard 602. Due to the changes that were automatically made to the storage unit 600 by the manufacturing preparation module 130, the sink 550 now fits. In addition to reconfiguring the storage unit 600, the manufacturing preparation module 130 can also enlarge the interface 552 such that the sink 550 fits. The manufacturing module can also make the changes to a CNC file, or equivalent, such that the specified millwork facility can automatically manufacture the resolved storage unit 600 and sink 550.

In at least one implementation, when resolving inconsistencies within a particular architectural design, the manufacturing preparation module 130 can rely upon a series of predefined constraints. For example, the manufacturing preparation module 130 can be directed to leave unchanged the external boundaries of a particular architectural element. For instance, the storage unit 600 and sink 550 from FIG. 5F can have the same external specifications as the original storage unit 600 from FIG. 5E. One will understand that, in some cases, adjusting the external boundaries of the storage unit 600 can prevent the storage unit 600 from fitting in the location for which it was designed.

Additionally, in at least one implementation, the manufacturing preparation module 130 can be directed to adjust an architectural design to incorporate the hardware components specified by the configuration list module 160. For example, one will understand that, in general, a sink 550 cannot be placed directly over a drawer 604 because the sink will extend too deeply into the storage unit 600. Accordingly, in at least one implementation, the manufacturing preparation module 130 can identify that the cupboard 602 (and not the drawers 604, 606, 608) should be expanded to allow the sink 550 to fit.

In determining how to resolve inconsistency within an architectural design, in at least one implementation, the manufacturing preparation module 130 can receive direction from at least one independently executable software object associated with a space 212, 214 within the framework. For example, as described above, a particular space 212 may identify itself as a cupboard 602, while another space 214 may identify itself as drawers 603, 606, 608. Additionally, the independently executable software object associated with the drawers can indicate that an object, such as a sink 550, should not be placed in the same space 214 as the drawers. In contrast, the independently executable software object associated with the cupboard 602 can indicate that an object, such as a sink (e.g., 550), can be placed in the same space 212 as the cupboards.

Once a user has finished designing an architectural element, the manufacturing preparation module 130 can generate one or more CNC codes (or equivalent) that corresponds with or otherwise describes the architectural element. In an alternate implementation, the manufacturing preparation module 130 can generate parameters that are exported to a post processor that generates an appropriate CNC code. Once the appropriate CNC code is generated a millwork facility can use the code to create the designed architectural element.

Figure 6:
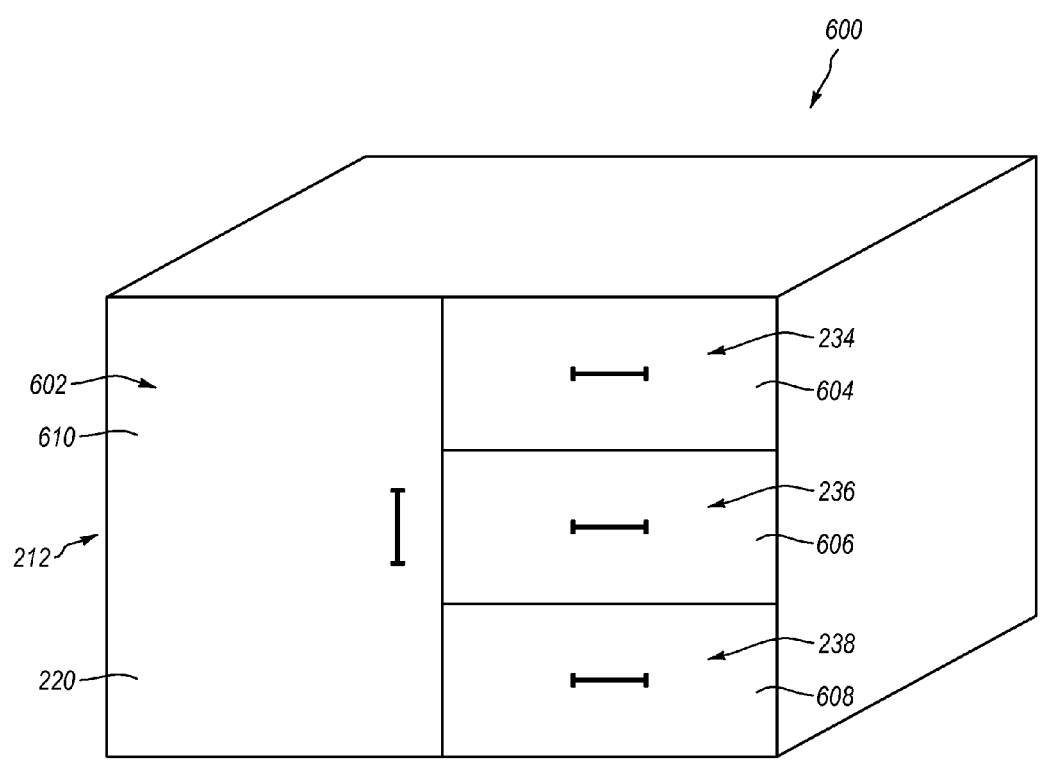
FIG. 6 depicts a finished rendering of an architectural element created in accordance with an implementation of the present invention.

FIG. 6 depicts a finished rendering of the architectural element 200. In particular, FIG. 6 shows that the storage unit 600 comprises a cupboard 602 that correlates with the space 212 that was create by the placement of cube splitter 210. In addition, FIG. 6 shows that the cupboard 602 comprises a door 610, which, for example, can be associated with facet 220. In addition, the storage unit 600 comprises three drawers 604, 606, 608 that were created by the combined placement of the cube splitter 210 and the facet splitters 230 and 232. As depicted, facet 234 can be associated with drawer 604, facet 236 with drawer 606, and facet 238 with drawer 608. In at least one implementation, additional designing that was not depicted directly by this application may have also been added to the framework 200. For example, the drawer 500 of FIGS. 5A-5D may have also been designed and added to the framework 200 of FIG. 6.

Additionally, in at least one implementation, the system can automatically add gaps to the various components of a framework 200 such that features like drawers 234, 236, 238 and doors 610 are easy to open and close and are not overly snug. In some cases, the gaps may comprise slight millimeter spaces that are incorporated around the edges of a particular facet 212, 234, 236, 238. One will understand that if certain components of architectural elements are not designed and built with a gap, the component may not function (or may function poorly), and such gaps can be easy to overlook during a conventional design face.

In addition to the foregoing, in at least one implementation, the storage device 150 (and/or a configuration list 152) provided by the configuration file module 160 can contain visual information relating to various third party hardware that specific millwork facilities use. As such, in at least one implementation, the user interface module 120 can render a depiction of the architectural element, in this case the storage unit 600, displaying the unit as it will appear in its final form, including the correct connection types and third party hardware.

In at least one implementation, once a user has designed an architectural element, the user can store the design within the storage device 150 for later access. For example, in at least one implementation, this allows the user to incorporate the architectural element into a new design. In particular, the designed framework can be recursively linked to an independently executable software object within another framework.

Figure 7A:
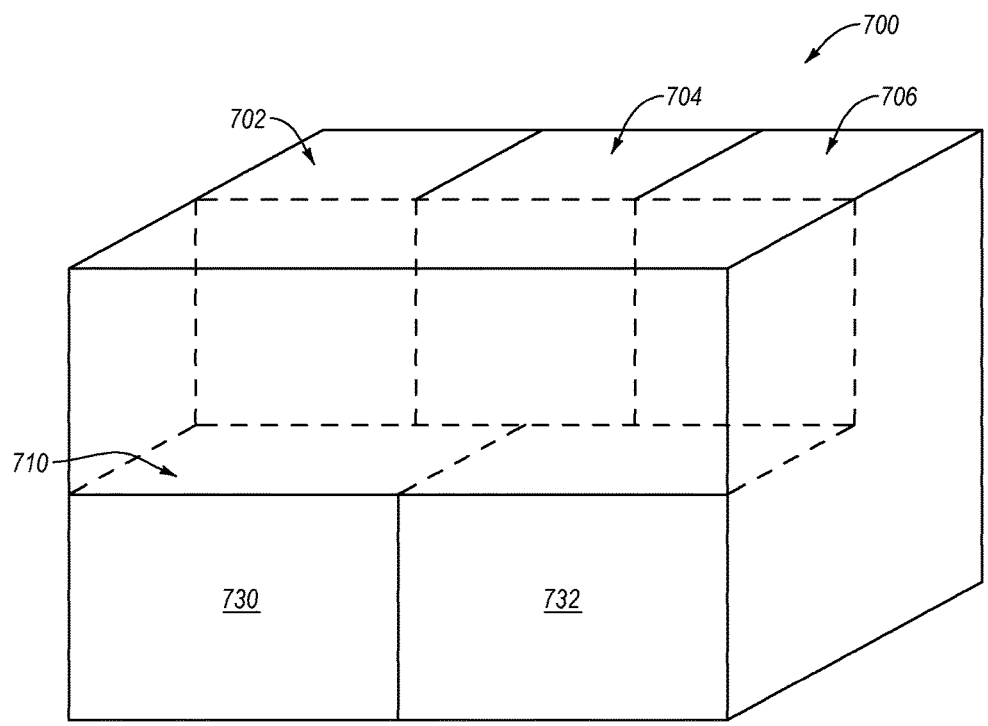
FIG. 7A illustrates a spatial framework created in accordance with the) inventive system illustrated in FIG. 1.
Figure 7B:
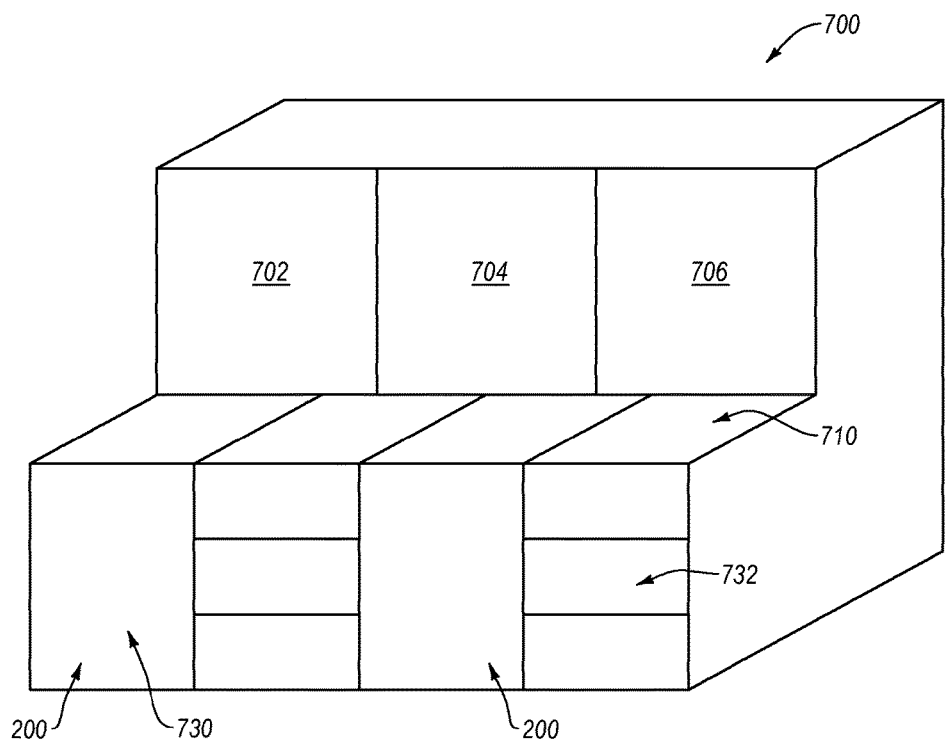
FIG. 7B illustrates a second spatial framework embedded within the spatial framework of FIG. 7A, created in accordance an implementation of the present invention.

FIGS. 7A and 7B depict implementations for incorporating one framework (e.g., 200, FIG. 2C) into another. For example, FIG. 7A depicts a master framework 700 that includes a counter 710, three upper spaces 702, 704, 706, and two larger lower spaces 730, 732. In at least one implementation, the framework module 140 can associate a distinct framework 200 with a space 730, 732. Specifically, the space module 144 can use the recursion module 148 to associate a distinct framework with the independently executable software object that is associated with the space 730, 732. In other words, in at least one implementation, the system associates each space 730, 732 within a framework 700 with an independently-executable software object, which can recursively reference a copy of another distinct framework 200. As previously mentioned, an independently executable software object comprises a set of computer-executable instructions used in object-oriented program code, and which relate to a particular physical component or feature.

Returning to FIGS. 7A and 7B, a user can associate the two distinct frameworks 200 each representing the storage unit 600 from FIG. 6 with spaces 730 and 732 respectively. FIG. 7B depicts the resulting master framework 700 that includes spaces 702, 704, and 706, which can be designed into cupboards, and spaces 730 and 732, which both now contain frameworks 200 that are associated with storage units 600.

In at least one implementation, associating distinct frameworks 200 with spaces 730, 732 within a master framework provides a user with tremendous power and flexibility in creating a design. For example, each framework 200 can independently access a framework module 140 and all other associated modules 142, 144, 146, 148. This can allow a framework 200 to dynamically and automatically adjust to any changes that are made to a master framework 700.

Additionally, in at least one implementation, a storage device 150 can comprise a framework library of pre-designed architectural elements. Each of these stored frameworks can be associated with one or more independently executable software objects that can be recursively linked to other frameworks. For example, a designer can design an office space by accessing a group of stored frameworks that represent shelving units, desks, filing cabinets, cupboards, drawers, etc.

Once a designer identifies particular stored frameworks that the designer wants to use, the designer can simply insert the chosen framework into a space within a master framework. Using pre-designed frameworks a designer can create a master framework that represents an entire office. Additionally, because the entire office was designed using spatial frameworks associated with independently executable software objects, the entire office design can change automatically to account for different sizes, materials, features, etc., and such changes will correctly propagate throughout the design.

Figure 8A:
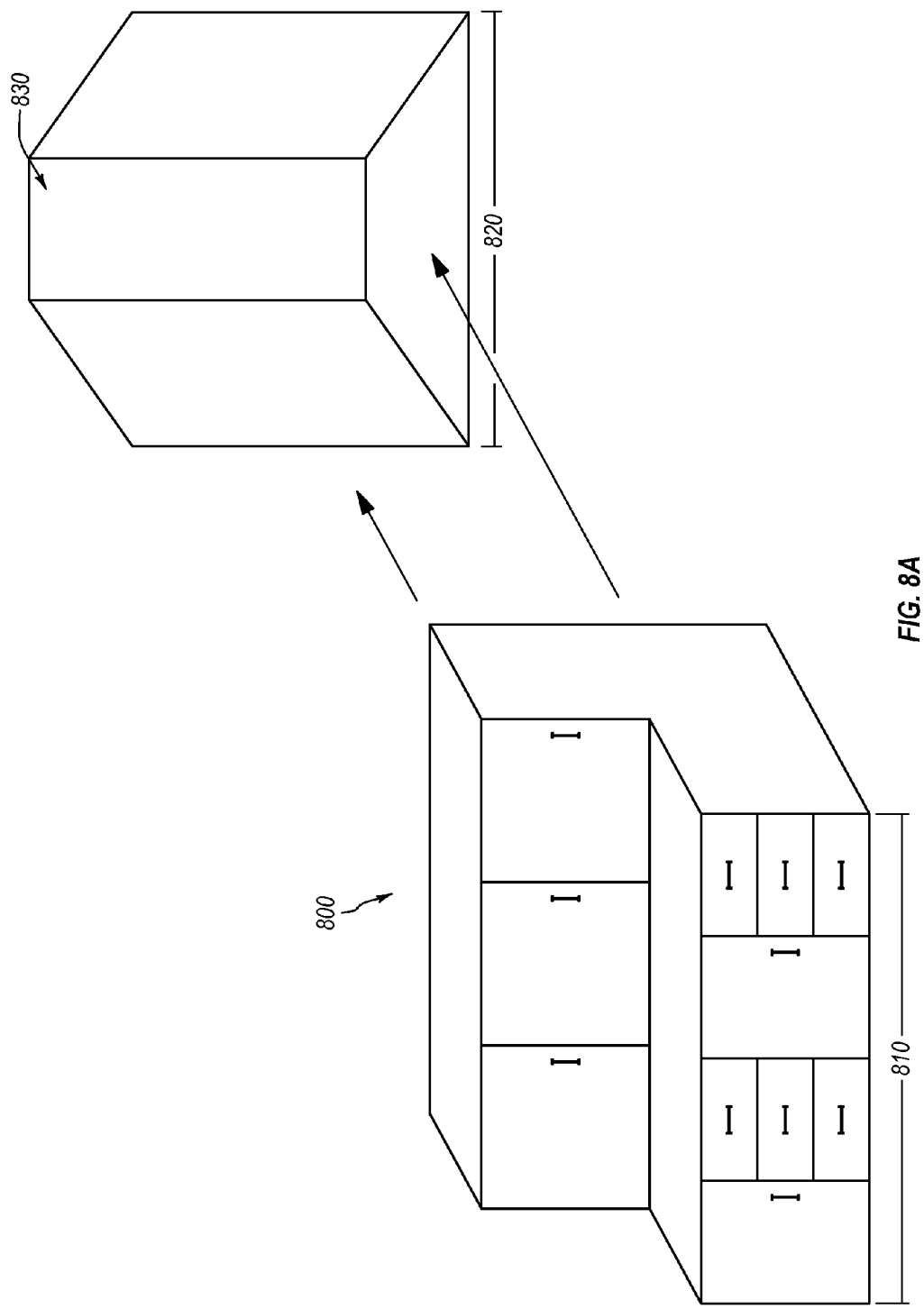
FIG. 8A depicts an oversized cabinet system and an alcove in accordance with an implementation of the present invention.

For example, FIG. 8A depicts the cabinet system 800 designed in FIGS. 7A and 7B. The cabinet system 800 comprises a length 810, and a receiving wall 830 comprises a length 820. As depicted, length 810 is significantly longer than length 820 of the receiving wall. In at least one implementation, a user can specify that the length of the cabinet system 800 should be length 820. The framework module 140, in turn, can automatically adjust the length of the cabinet system 800 to be length 820, while at the same time automatically and correctly adjusting all of the features of the cabinet system.

Figure 8B:
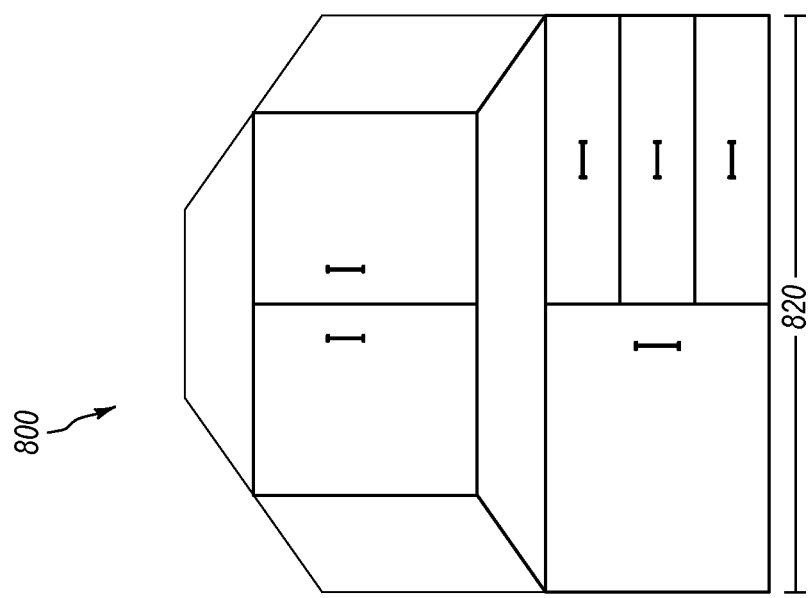
FIG. 8B depicts the cabinet system of FIG. 8A automatically adjusted to fit within the alcove in accordance with an implementation of the present invention.

FIG. 8B depicts an implementation of an adjusted cabinet system 800. As shown, the system (e.g., via framework module 140) automatically removed a cupboard and one of the storage units. In at least one implementation, the removal of the cupboard and storage unit may be a result of using absolute measurements when tracking the location and behavior of the cube splitters 210 and facet splitters 230, 232, such as described with respect to FIG. 3. In particular, the framework module 140 may have identified that the storage unit length was reduced so much that there was no longer room to place the cube splitters 210 and facet splitters 230, 232 as was initially specified. Accordingly, the system (e.g., via framework module 140) can automatically determine that, because the original length specifications cannot be met, a cupboard and a storage unit (represented by framework 200 in space 732) should be removed.

Figure 9A:
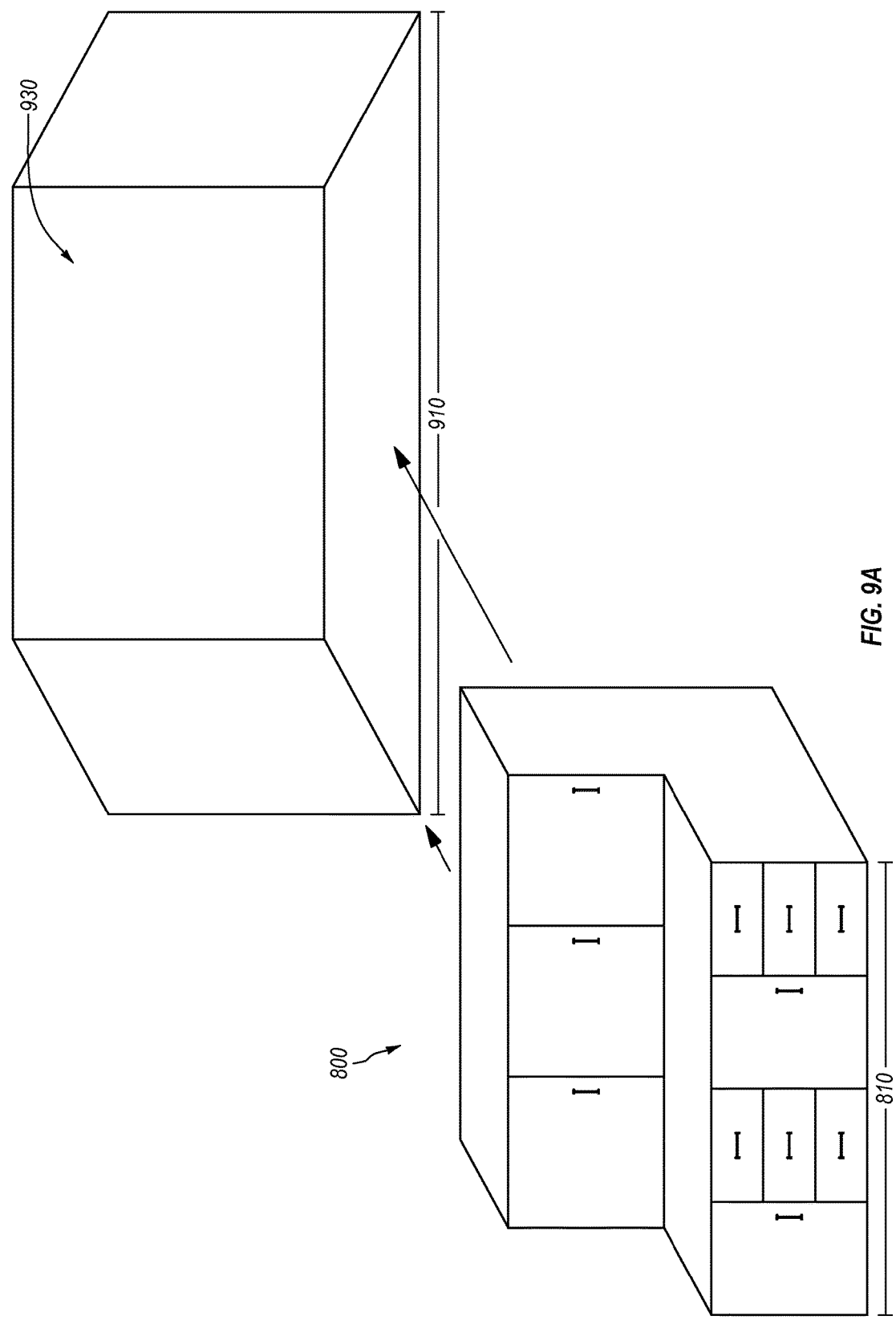
FIG. 9A depicts an undersized cabinet system and an alcove in accordance with an implementation of the present invention.
Figure 9B:
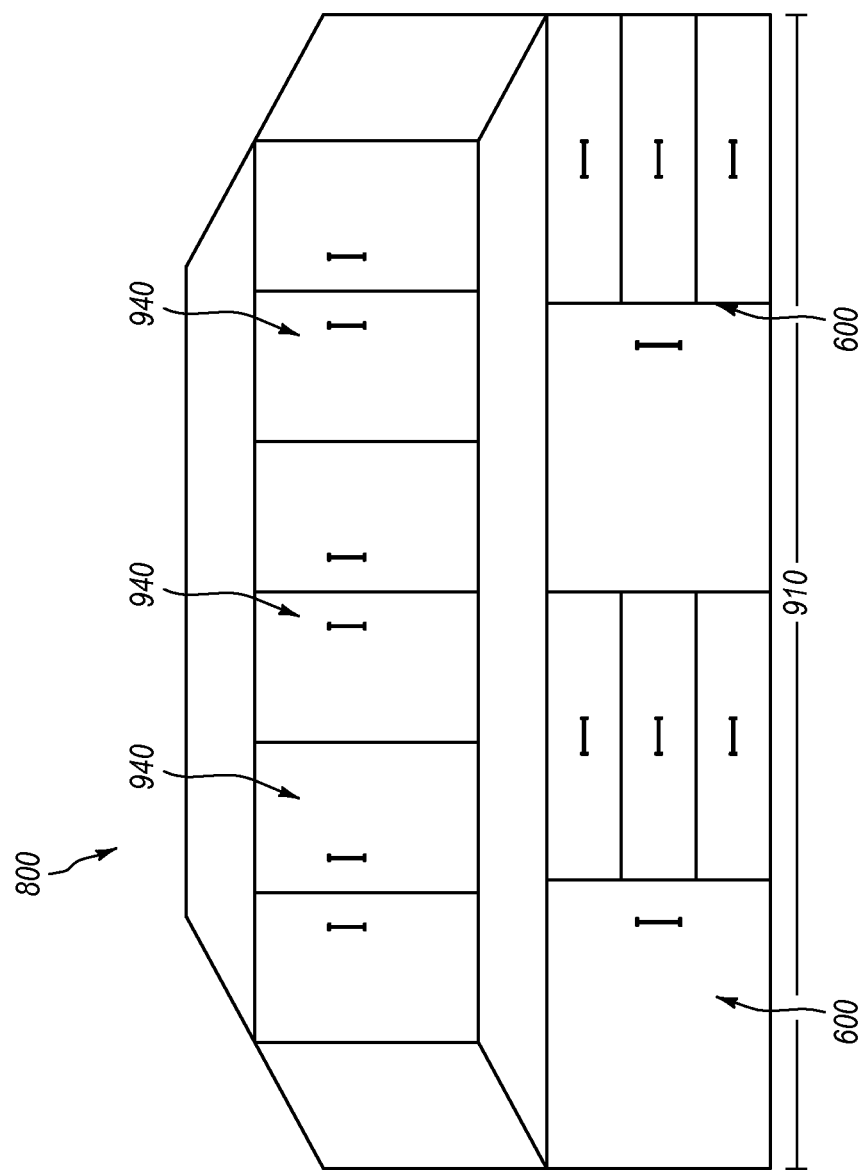
FIG. 9B depicts the cabinet system of FIG. 9A automatically adjusted to fit within the alcove in accordance with an implementation of the present invention.

As an alternate example, FIGS. 9A and 9B depict an architectural element being expanded to fit a particular specification. For example, the cabinet system 800 comprises a length 810, and a receiving wall 930 comprises a length 910. As depicted, length 810 is significantly smaller than length 910 of the receiving wall 930. As stated above, in at least one implementation, a user can specify that the length of the cabinet system 800 should be 910. The framework module 140, in turn, can automatically adjust the length of the cabinet system 800 to be length 910, while at the same time automatically and correctly adjusting all of the features of the cabinet system.

FIG. 9B depicts an implementation of an adjusted cabinet system 800. In this implementation, the system (e.g., via framework module 140) automatically expanded the length of the storage units 600 and added double doors 940 to each of the three cabinets. In at least one implementation, the expansion of the storage unit may be a result of using proportional measurements when tracking the location and behavior of the cube splitters 210 and facet splitters 230, 232 as described with respect to FIG. 3. In particular, the framework module 140 may have identified that the cube splitter between spaces 730 and 732 was specified as being placed at half the length of the bottom most boundary. As such, the framework module 140 simply expanded the storage units to fill the larger length.

With respect to the cupboards, in at least one implementation, the framework module 140 and/or the manufacturing preparation module 130 can automatically identify some finishing features, such as, for example, whether a cupboard is narrow enough to only require a single door, or so wide as to require double doors 940. In the depicted example, the system (e.g., via framework module 140 and/or the manufacturing preparation module 130) determined that double doors were appropriate due to the increased length of the cabinet system 800.

Accordingly, FIGS. 1-9 and the corresponding text illustrate or otherwise describe one or more components, modules, and/or mechanisms for automatically resolving boundaries. One will appreciate that implementations of the present invention can also be described in terms of methods comprising one or more acts for accomplishing a particular result. For example, FIGS. 10 and 11 and the corresponding text illustrate flowcharts of a sequence of acts in a method for resolving boundaries within an architectural design. The acts of FIGS. 10 and 11 are described below with reference to the components and modules illustrated in FIGS. 1-9.

Figure 10:
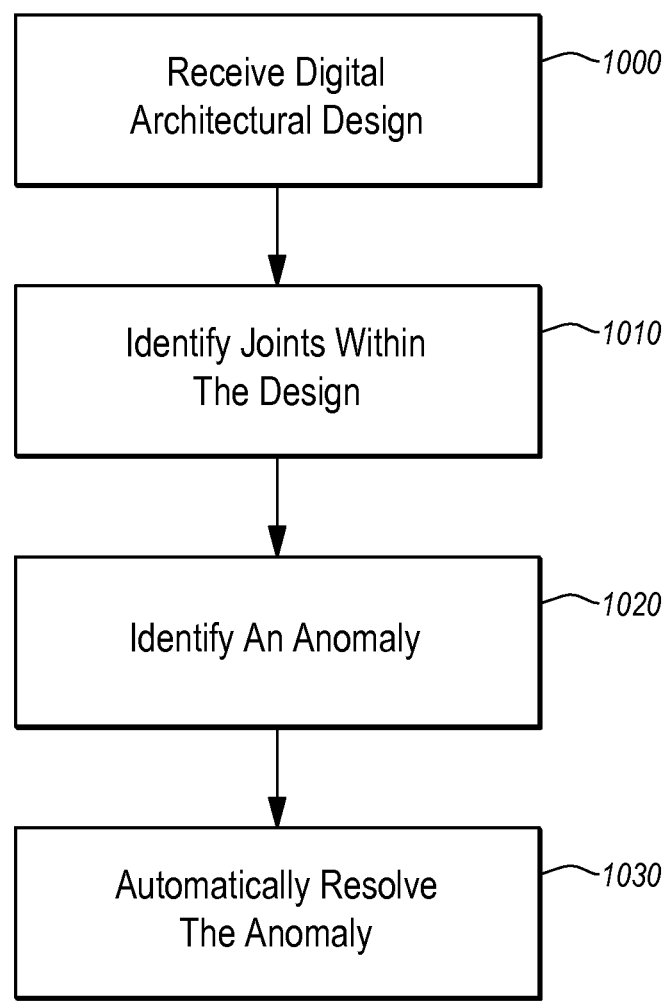
FIG. 10 illustrates a flowchart of a series of acts in a method in accordance with an implementation of the present invention for incorporating third party features into an architectural design.
Figure 11:
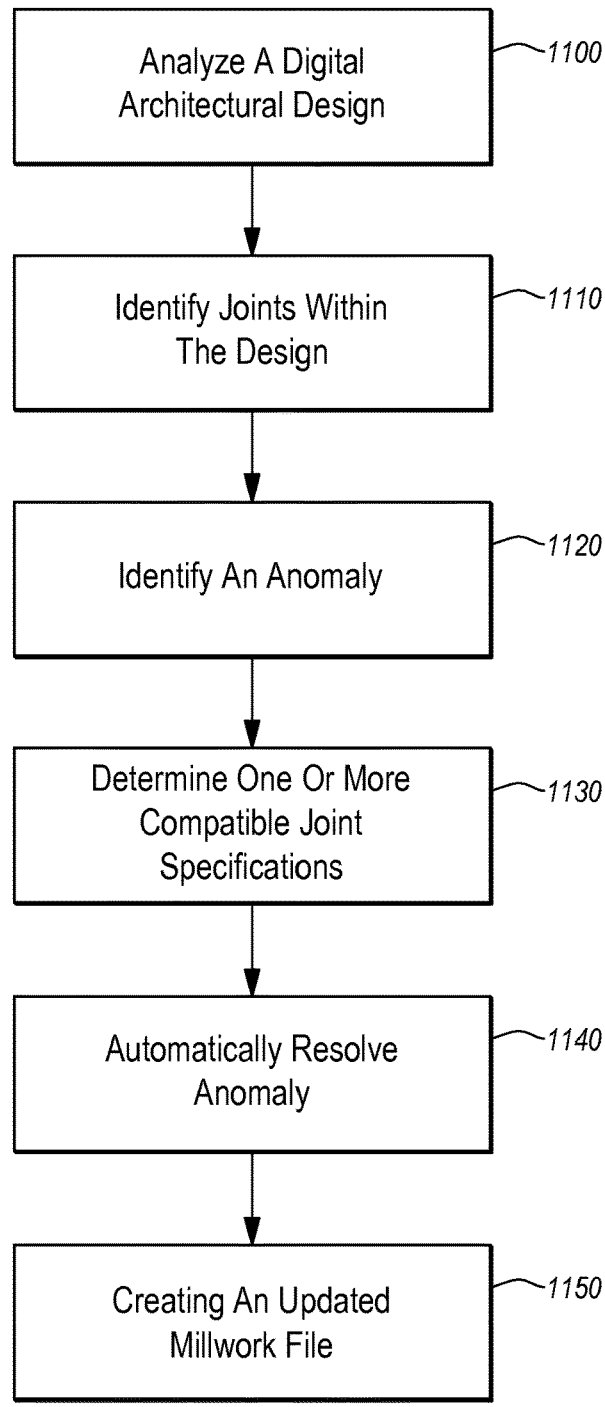
FIG. 11 illustrates another flowchart of a series of acts in a method in accordance with an implementation of the present invention for incorporating third party features into an architectural design.

For example, FIG. 10 illustrates that a method for resolving boundaries within architectural design can comprise an act 1000 of receiving a digital architectural design. Act 1000 includes receiving a digital architectural design comprising a first furniture sub-component, a second furniture sub-component, and a third furniture sub-component. For example, in FIG. 4A and the accompanying description, the millwork software 100 receives an architectural design that comprises a first furniture sub-component 400(*a*), a second furniture sub-component 402(*a*), and a third furniture sub-component 404(*a*). The design depicted in FIG. 4A may be the initial design of a desk, a chest, shelf, or some other similar furniture piece. In any case, the millwork software 100 can receive an architectural design that comprises multiple sub-components.

FIG. 10 also shows that the method can comprise an act 1010 of identifying joints within the design. Act 1010 includes identifying, with a computer processor, a first joint between the first furniture sub-component and the second furniture sub-component, a second joint between the second furniture sub-component and the third furniture sub-component, a third joint between the third furniture sub-component and the first furniture sub-component. For example, FIG. 1 depicts a boundary module 146 that is configured to identify boundaries within an architectural design. For instance, FIG. 4A illustrates boundaries 410(*a*), 420(*a*), and 430(*a*), which can each by identified by the software through boundary module 146.

Additionally, FIG. 10 also shows that the method can comprise an act 1020 of identifying an anomaly. Act 1020 includes identifying an anomaly at the intersection of the first joint, the second joint, and the third joint, wherein the anomaly is created when the first joint, the second joint, and the third joint fail to create a proper corner. For example, FIG. 4B shows an anomaly 440 that occurs at the intersection of a particular arrangement of surfaces 400(*b*), 402(*b*), and 404(*b*). The boundary module 146 can automatically identify this anomaly 440 by identifying a gap at the illustrated joint.

Further, FIG. 10 shows that the method can comprise an act 1030 of automatically resolving the anomaly. Act 1030 can include automatically resolving the anomaly by changing the shape or orientation of at least one of the first joint, the second joint, or the third joint within the digital architectural design. The Act can also include sending rendering instructions to a display device for visually displaying the corrected anomaly. For example, FIG. 4B and the accompanying text describe and depict an architectural design with an anomaly 440. The boundary module 146 can engage in various methods and actions to automatically resolve the anomaly. For instance, the software 100 can adjust the surfaces 400, 402, and 404 of FIGS. 4A 4B (whether adjusting position, sizing, or the like, as appropriate), such that the front panel 402 overlaps the side panel 404 to correct the anomaly. The software 100 can then display the corrected joint.

Additionally, FIG. 11 illustrates an additional or alternative method for resolving boundaries within architectural design can comprise an act 1100 of analyzing a digital architectural design. Act 1100 includes analyzing, with a computer processor, digital architectural design input received from a user. The digital architectural design input can comprise a first furniture sub-component, a second furniture sub-component, and a third furniture sub-component. The first furniture sub-component, the second furniture sub-component, and the third furniture sub-component can each be associated with one or more independently executable software objects. For example, upon receipt of appropriate input, the software 100 can automatically identify that an architectural design comprises a first furniture sub-component 400, a second furniture sub-component 402, and a third furniture sub-component 404. As described in the accompanying description, one or more of the sub-components 400, 402, 404 can be associated with an independently executable software object.

FIG. 11 also shows that the method can comprise an act 1110 of identifying joints within the design. Act 1110 includes identifying a first joint between the first furniture sub-component and the second furniture sub-component, a second joint between the second furniture sub-component and the third furniture sub-component, a third joint between the third furniture sub-component and the first furniture sub-component. For example, FIG. 1 depicts a boundary module 146 that is configured to identify boundaries within an architectural design. For instance, in FIG. 4A and the accompanying description, the software 100 (e.g., via boundary module 146) can identify boundaries 410, 420, and 430.

Additionally, FIG. 11 shows that the method can comprise an act 1120 of identifying an anomaly. Act 1120 includes identifying an anomaly at the intersection of the first joint, the second joint, and the third joint, wherein the anomaly is created when the first joint, the second joint, and the third joint fail to create a proper corner. For example, as discussed with respect to FIGS. 4A and 4B, the software 100 (e.g., the boundary module 146) can identify anomaly 440, such as by identifying a gap in a corner where various surfaces or sub-components meet improperly.

FIG. 11 also shows that the method can comprise an act 1130 of determining one or more compatible joint specifications. Act 1130 can include determining one or more joint specifications that are compatible with the architectural design from information retrieved from the one or more independently executable software objects. For example, as described with respect to FIG. 4B, the software 100 (e.g., via the boundary module 146) can access an independently executable software object (not shown) to receive information such as material type, dimensions, strength requirements, and other related characteristics that determine compatible joint specifications. For instance, upon determining that the various furniture sub-components are constructed of marble, the boundary module 146 may determine that overlap joints should be used to more easily display the marble.

Further, FIG. 11 shows that the method can comprise an act 1140 of automatically resolving the anomaly. Act 1140 can include creating an updated digital architectural design with an automatic resolution of the anomaly by changing the type of at least one of the first joint, the second joint, or the third joint to comprise a revised joint that conforms with the one or more joint specifications. For example, FIGS. 4A and 4B and the accompanying description describe and depict an architectural design with an anomaly 440. In at least one implementation, the software 100 (e.g., via boundary module 146) can change boundary 422, such that the front panel 402 overlaps the side panel 404, thus making all of the seams meet up perfectly, and which would correct the anomaly.

Further still, FIG. 11 shows that the method can comprise an act 1150 of creating an updated millwork file. Act 1150 can include storing the updated digital architectural design in a format specific to a millwork facility. For example, FIG. 1 and the accompanying description describes and depicts a manufacturing preparation module 130 disposed within the millwork software 100. The manufacturing preparation module 130 can architectural design, including the revised joint, and create a file that is formatted for manufacturing at a millwork facility.

Accordingly, FIGS. 1-11 and the corresponding text illustrate or otherwise describe a number of components, schematics, and mechanisms for incorporating automatically resolving boundaries within an architectural design. One will appreciate that these components and modules in accordance with implementations of the invention can allow a designer to develop an architectural element, such as a desk or even an entire kitchen, without knowing the specific joints that are used by a particular millwork facility. For example, a user can design a kitchen, including cabinets, drawers, counter tops, sink locations, etc., without knowing the specific joints that will be used to construct the cabinet and counter. Additionally, these and other implementations of the invention can be used to identify an anomaly within an architectural design before the design is manufactured at a millwork. Various modules, such as boundary module 146, can then automatically correct a corner anomaly without any user interaction, or with only minimal user interaction.

In addition to the foregoing, one will appreciate that embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention may be embodied in other specific forms without departing from its spirit or essential characteristics. For example, the flexible dies can include flexible protrusions on both the front and back surfaces. Thus, a single flexible die can form recesses into surfaces of two different panels at the same time. Furthermore, the panels can include recesses in both the front and back surfaces. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A computer implemented method being performed in a computerized environment comprising a computer system that receives user design input for automatically resolving joint anomalies within digital joints of an architectural design, wherein such digital joints are representative of physical joints manufacturable in a millwork facility, the method comprising:
   receiving a digital architectural design comprising a first furniture sub-component, a second furniture sub-component, and a third furniture sub-component;
   identifying, with a computer processor, an arrangement of three mutually interconnected sub-components the arrangement including a first joint between the first furniture sub-component and the second furniture sub-component, a second joint between the second furniture sub-component and the third furniture sub-component, a third joint between the third furniture sub-component and the first furniture sub-component, wherein the received digital architectural design includes a particular type of joint corresponding to each of the first joint, the second joint, and the third joint;
   identifying an anomaly at an intersection of the first joint, the second joint, and the third joint, wherein the anomaly is created when the first joint, the second joint, and the third joint fail to create a proper corner;
   automatically resolving the anomaly by changing a shape or orientation of at least one of the first joint, the second joint, or the third joint within the digital architectural design to create an updated digital architectural design;
   storing the updated digital architectural design in a file format acceptable to a millwork facility; and
   sending rendering instructions to a display device for visually displaying the resolved anomaly.

2. The method as recited in claim 1, wherein each of the first furniture sub-component, the second furniture sub-component, and the third furniture sub-component is associated with a respective independently executable software object.

3. The method as recited in claim 2 further comprising:
   accessing the independently executable software object that is associated with the second furniture sub-component;
   determining one or more types of joints that are compatible with the second furniture sub-component; and
   changing the type of the second joint to one of the one or more types of compatible joints.

4. The method as recited in claim 2 further comprising:
   accessing the independently executable software object that is associated with the third furniture sub-component;
   determining one or more types of joints that are compatible with the third furniture sub-component; and
   changing the type of the third joint to one of the one or more types of compatible joints.

5. The method as recited in claim 1 further comprising:
   determining that the first joint is preferred; and
   automatically resolving the anomaly by changing the particular type of at least one of the second joint or the third joint.

6. The method as recited in claim 5 wherein determining that the first joint is preferred comprises receiving an indication from a user that the first joint is preferred.

7. The method as recited in claim 5 wherein determining that the first joint is preferred further comprises determining that the first joint was created before the second joint and the third joint.

8. The method as recited in claim 5 wherein determining that the first joint is preferred further comprises determining that the first joint was created after the second joint and the third joint.

9. The method as recited in claim 5 wherein determining that the first joint is preferred further comprises:
identifying one or more additional joints within the architectural design;
determining a joint type associated with each of the one or more additional joints; and
determining that the first joint is the same type of joint as the one or more additional joints.

10. The method as recited in claim 1 further comprising:
generating a computer numerical code file that corresponds with the architectural design, including the changed first, second, or third joint.

11. A computer implemented method being performed in a computer-based system comprising one or more processors for receiving and processing user design input for automatically resolving joint anomalies within digital joints of an architectural design, wherein such digital joints are representative of physical joints manufacturable in a millwork facility, the method comprising:
analyzing, with a computer processor, digital architectural design input received from a user, the digital architectural design input comprising an arrangement of three mutually interconnected furniture sub-components the arrangement including a first furniture sub-component, a second furniture sub-component, and a third furniture sub-component, wherein the first furniture sub-component, the second furniture sub-component, and the third furniture sub-component are each associated with one or more independently executable software objects;
identifying a first joint between the first furniture sub-component and the second furniture sub-component, a second joint between the second furniture sub-component and the third furniture sub-component, a third joint between the third furniture sub-component and the first furniture sub-component, wherein the received digital architectural design includes a particular type of joint corresponding to each of the first joint, the second joint, and the third joint;
identifying an anomaly at an intersection of the first joint, the second joint, and the third joint, wherein the anomaly is created when the first joint, the second joint, and the third joint fail to create a proper corner;
determining one or more joint specifications that are compatible with the architectural design from information retrieved from the one or more independently executable software objects;
creating an updated digital architectural design with an automatic resolution of the anomaly by changing the particular type of at least one of the first joint, the second joint, or the third joint to comprise a revised joint that conforms with the one or more joint specifications; and
storing the updated digital architectural design in a file format acceptable to a millwork facility.

12. The method as recited in claim 11 further comprising:
determining that the first joint is preferred; and
automatically resolving the anomaly by changing the particular type of at least one of the second joint or the third joint.

13. The method as recited in claim 12 wherein determining that the first joint is preferred comprises receiving an indication from a user that the first joint is preferred.

14. The method as recited in claim 12 wherein determining that the first joint is preferred further comprises determining that the first joint was created before the second joint and the third joint.

15. The method as recited in claim 12 wherein determining that the first joint is preferred further comprises determining that the first joint was created after the second joint and the third joint.

16. The method as recited in claim 12 wherein determining that the first joint is preferred further comprises:
identifying one or more additional joints within the architectural design;
determining a joint type associated with each of the one or more additional joints; and
determining that the particular type of the first joint is the same particular type of joint as the one or more additional joints.

17. The method as recited in claim 11 further comprising:
identifying one or more additional joints within the architectural design;
determining the type of joint associated with each of the one or more additional joints; and
automatically resolving the anomaly by changing the type of at least one of the first joint, the second joint, or the third joint to comprise a revised joint that matches one of the determined type of joints.

18. The method as recited in claim 17 wherein the one or more additional joints within the architectural design are joints adjacent to the first joint, the second joint, or the third joint.

19. The method as recited in claim 17 wherein the one or more additional joints within the architectural design are joints framing a same furniture sub-component as the first joint, the second joint, or the third joint.

20. A computer system comprising:
one or more processors
a hardware storage device having stored thereon computer executable instructions that are executable by the one or more processors to cause the computer system to automatically resolve joint anomalies within digital joints of an architectural design, wherein such digital joints are representative of physical joints manufacturable in a millwork facility, the computer-executable instructions further including instructions to cause the computer system to perform the following:
receive a digital architectural design comprising an arrangement of three mutually interconnected furniture sub-components the arrangement including a first furniture sub-component, a second furniture sub-component, and a third furniture sub-component;
identify a first joint between the first furniture sub-component and the second furniture sub-component, a second joint between the second furniture sub-component and the third furniture sub-component, a third joint between the third furniture sub-component and the first furniture sub-component, wherein the received digital architectural design includes a particular type of joint corresponding to each of the first joint, the second joint, and the third joint;

identify an anomaly at an intersection of the first joint, the second joint, and the third joint, wherein the anomaly is created when the first joint, the second joint, and the third joint fail to create a proper corner; and automatically resolve the anomaly by changing the particular type of at least one of the first joint, the second joint, or the third joint within the digital architectural design to create an updated digital architectural design;

storing the updated digital architectural design in a file format acceptable to a millwork facility; and sending rendering instructions to a display device for visually displaying the corrected anomaly.

\* \* \* \* \*